(12) United States Patent
Zellers et al.

(10) Patent No.: US 12,504,409 B2
(45) Date of Patent: Dec. 23, 2025

(54) MICROSCALE COLLECTOR-INJECTOR TECHNOLOGIES FOR PASSIVE ENVIRONMENTAL VAPOR SAMPLING AND FOCUSED INJECTION

(71) Applicant: THE REGENTS OF THE UNIVERSITY OF MICHIGAN, Ann Arbor, MI (US)

(72) Inventors: Edward T. Zellers, Ann Arbor, MI (US); Changhua Zhan, Ann Arbor, MI (US); Robert W. Hower, Ann Arbor, MI (US); Joseph A. Potkay, Plymouth, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 18/243,364

(22) Filed: Sep. 7, 2023

(65) Prior Publication Data

US 2023/0417711 A1    Dec. 28, 2023

Related U.S. Application Data

(62) Division of application No. 16/252,081, filed on Jan. 18, 2019, now Pat. No. 11,782,033.

(51) Int. Cl.
*G01N 1/40* (2006.01)
*G01N 30/08* (2006.01)
(Continued)

(52) U.S. Cl.
CPC ......... *G01N 30/6095* (2013.01); *G01N 1/405* (2013.01); *G01N 30/08* (2013.01);
(Continued)

(58) Field of Classification Search
CPC .............................................. G01N 2030/0095
See application file for complete search history.

(56) References Cited

U.S. PATENT DOCUMENTS

| | | | |
|---|---|---|---|
| 1,316,602 A | 9/1919 | Sperr | |
| 4,970,172 A * | 11/1990 | Kundu | ................... A61B 5/083 436/130 |

(Continued)

FOREIGN PATENT DOCUMENTS

| | | |
|---|---|---|
| EP | 1563284 B1 | 2/2010 |
| JP | H1066820 A | 3/1998 |

(Continued)

OTHER PUBLICATIONS

Non-Final Office Action issued Jan. 17, 2023, in U.S. Appl. No. 16/252,081.

(Continued)

*Primary Examiner* — John E Breene
*Assistant Examiner* — Alex T Devito
(74) *Attorney, Agent, or Firm* — Harness, Dickey & Pierce, P.L.C.

(57) ABSTRACT

A microscale collector and injector device comprises a microscale passive pre-concentrator (μPP) and a microscale progressively-heated injector (μPHI). The μPP devices comprises first and second substrate portions, a first collection material, a μPP heater, and an outlet. The first substrate portion defines an array of microscale diffusion channels. The first and second substrate portions cooperate to define a first compartment in fluid communication with the diffusion channels. The first collection material is disposed within the first compartment, at least partially surrounding the outlet. The μPP heater is disposed in thermal communication with the second substrate portion. The μPHI device comprises third and fourth substrate portions, a second collection material, and a plurality of μPHI heaters. The third and (Continued)

fourth substrate portions cooperate to define a second compartment. The second collection material is disposed within the second compartment. The μPHI heaters are disposed in thermal communication with the second compartment.

21 Claims, 13 Drawing Sheets

(51) Int. Cl.
- *G01N 30/16* (2006.01)
- *G01N 30/60* (2006.01)
- *F16L 53/00* (2018.01)
- *G01N 25/00* (2006.01)
- *G01N 30/00* (2006.01)
- *G01N 30/52* (2006.01)

(52) U.S. Cl.
CPC .............. *G01N 30/16* (2013.01); *F16L 53/00* (2013.01); *G01N 25/00* (2013.01); *G01N 2030/0095* (2013.01); *G01N 30/52* (2013.01)

(56) References Cited

U.S. PATENT DOCUMENTS

| | | | |
|---|---|---|---|
| 6,413,882 B1 | 7/2002 | Leung et al. | |
| 6,518,205 B1 | 2/2003 | Wu et al. | |
| 6,914,220 B2 | 7/2005 | Tian et al. | |
| 7,000,452 B2 | 2/2006 | Bonne et al. | |
| 7,104,112 B2 | 9/2006 | Bonne | |
| 7,367,216 B2 | 5/2008 | Bonne | |
| 7,381,441 B2 | 6/2008 | Leung et al. | |
| 7,381,442 B2 | 6/2008 | Lu et al. | |
| 7,530,257 B2 | 5/2009 | Bonne | |
| 7,578,167 B2 | 8/2009 | Bonne et al. | |
| 7,744,818 B2 | 6/2010 | Iwamoto et al. | |
| 7,779,671 B2 | 8/2010 | Bonne | |
| 9,316,623 B2 | 4/2016 | Seo et al. | |
| 2004/0056016 A1* | 3/2004 | Tian | H05B 3/26 |
| | | | 219/385 |
| 2004/0259265 A1 | 12/2004 | Bonne | |
| 2006/0258017 A1 | 11/2006 | Gullett et al. | |
| 2006/0259265 A1 | 11/2006 | Mishima et al. | |
| 2011/0023581 A1 | 2/2011 | Chou et al. | |
| 2011/0247394 A1 | 10/2011 | McBrady | |
| 2016/0305693 A1 | 10/2016 | Moghaddam et al. | |
| 2020/0232954 A1 | 7/2020 | Zellers et al. | |

FOREIGN PATENT DOCUMENTS

| | | |
|---|---|---|
| JP | 2005015294 A | 1/2005 |
| WO | WO-03076048 A1 | 9/2003 |

OTHER PUBLICATIONS

Notice of Allowance issued Jun. 14, 2023, in U.S. Appl. No. 16/252,081.

* cited by examiner 4 mm

MICROSCALE COLLECTOR-INJECTOR TECHNOLOGIES FOR PASSIVE ENVIRONMENTAL VAPOR SAMPLING AND FOCUSED INJECTION

CROSS-REFERENCE TO RELATED APPLICATIONS

This application is a divisional of U.S. patent application Ser. No. 16/252,081 filed on Jan. 18, 2019. The entire disclosure of the above application is incorporated herein by reference.

GOVERNMENT SUPPORT

The invention was made with U.S. Government support. The U.S. Government has certain rights in the invention.

FIELD

The present disclosure relates to a microscale collector-injector for passive environmental vapor sampling and focused injection.

BACKGROUND

This section provides background information related to the present disclosure which is not necessarily prior art.

Gas chromatographic microsystems (μGCs) offer the potential for analyzing mixtures of volatile organic compounds and semi-volatile organic compounds (S/VOCs) in miniature packages suitable for personal exposure monitoring; point-of-care medical diagnostics; defense applications, such as explosive and chemical warfare agent detection; environmental testing; and intelligence applications, such as detection of narcotics; and other applications. A typical μGC may include an accumulator, a sample injector or focuser, a separation column, and a detector, each of which may be fabricated from silicon, glass, or other suitable materials, and are generally provided as separate devices or components.

SUMMARY

This section provides a general summary of the disclosure, and is not a comprehensive disclosure of its full scope or all of its features.

In various aspects, the present disclosure provides a microscale passive pre-concentrator (μPP) device. The μPP device comprises a first substrate, a second substrate, a first collection material, a heating unit, and a central outlet. The first substrate defines an array of microscale diffusion channels. The second substrate is coupled to the first substrate. The first substrate and the second substrate cooperate to define a compartment. The compartment is in fluid communication with the array of microscale diffusion channels. The first collection material is disposed within the compartment and configured to capture compounds within a first range of vapor pressures. The heating unit is disposed in thermal communication with the second substrate. The heating unit is configured to heat the compartment. The first collection material at least partially surrounds the central outlet. The μPP device is configured to collect a sample at a known rate by using passive diffusion, without use of artificial circulation, and subsequently discharge the sample through the central outlet.

In one aspect, the first collection material is disposed in a first region. The first region defines a substantially annular or substantially semi-annular shape.

In one aspect, the μPP device further comprises a second collection material. The second collection material is configured to capture compounds within a second range of vapor pressures. The second collection material is disposed in a second region. The second region at least partially surrounds the first region. The second region generally defines an annulus or a portion of an annulus.

In one aspect, the μPP device further comprises a third collection material. The third collection material is configured to capture compounds within a third range of vapor pressures. The third collection material is disposed in a third region. The third region at least partially surrounds the second region. The third region generally defines an annulus or a portion of an annulus.

In one aspect, the first collection material comprises a first plurality of adsorbent granules. The first plurality of adsorbent granules defines a first average specific surface area. The second collection material comprises a second plurality of adsorbent granules. The second plurality of adsorbent granules defines a second average specific surface area. The second average specific surface area is distinct from the first average specific surface area.

In one aspect, the array of microscale diffusion channels is distributed across a region. The region generally defines a circle, a portion of a circle, an annulus, or a portion of an annulus.

In one aspect, at least a portion of the array of microscale diffusion channels is disposed outward of the first collection material with respect to the central outlet.

In one aspect, the μPP device further comprises a plurality of retention members. The plurality of retention members extends between the first substrate and the second substrate. The plurality of retention members cooperates with the first substrate and the second substrate to retain the first collection material within the compartment.

In various aspects, the present disclosure provides microscale progressively-heated injector (μPHI) device. The μPHI device comprises a first substrate, a second substrate, a first collection material, and a plurality of heating units. The second substrate is coupled to the first substrate. The first substrate and the second substrate cooperate to define a compartment. The first collection material is disposed within the compartment. The first collection material is configured to capture compounds within a first range of vapor pressures. The first collection material comprises a first plurality of adsorbent granules. The plurality of heating units is disposed in thermal communication with the compartment. The plurality of heating is configured to individually and sequentially heat respective portions of the compartment.

In one aspect, the μPHI device is configured to discharge a sample in an injection band having a full width at half maximum width (FWHM) of less than or equal to about 250 ms.

In one aspect, the plurality of heating units comprises greater than or equal to 5 to less than or equal to 20 heating units.

In one aspect, the heating units of the plurality of heating units are thermally isolated from one another.

In one aspect, each heating unit of the plurality of heating units is configured to heat a respective portion of the compartment.

In one aspect, the μPHI device further comprises a second collection material. The second collection material is disposed within the compartment. The second collection material is configured to capture compounds within a second range of vapor pressures.

In one aspect, the μPHI device further comprises a third collection material. The third collection material is disposed within the compartment. The third collection material is configured to capture compounds within a third range of vapor pressures.

In one aspect, the first plurality of adsorbent granules define a first average specific surface area. The second collection material comprises a second plurality of adsorbent granules. The second plurality of adsorbent granules defines a second average specific surface area. The second average specific surface area is distinct from the first average specific surface area.

In one aspect, the μPHI device further comprises a plurality of retention members. The plurality of retention members extends between the first substrate and the second substrate. The plurality of retention members cooperates with the first substrate and the second substrate to retain the first collection material within the compartment.

In various aspects, the present disclosure provides microscale collector and injector (μCOIN) device. The μCOIN device comprises a microscale passive pre-concentrator (μPP) and a microscale progressively-heated injector (μPHI). The μPP devices comprises a first substrate portion, a second substrate portion, a first collection material, a μPP heating unit, and a central outlet. The first substrate portion defines an array of microscale diffusion channels. The second substrate portion is coupled to the first substrate portion. The second substrate portion and the first substrate portion cooperate to define a first compartment. The first compartment is in fluid communication with the array of microscale diffusion channels. The first collection material is disposed within the first compartment. The first collection material is configured to capture compounds within a range of vapor pressures. The μPP heating unit is disposed in thermal communication with the second substrate portion. The μPP heating unit is configured to heat the first compartment. The first collection material at least partially surrounds the central outlet. The μPHI device comprises a third substrate portion, a fourth substrate portion, a second collection material, and a plurality of μPHI heating units. The fourth substrate portion is coupled to the third substrate portion. The fourth substrate portion cooperates with the third substrate portion to define a second compartment. The second collection material is disposed within the second compartment. The second collection material is configured to capture the compounds within the range of vapor pressures. The plurality of μPHI heating units is disposed in thermal communication with the second compartment. The plurality of μPHI heating units is configured to individually and sequentially heat respective portions of the second compartment. The μPP device is configured to collect a sample at a known rate by using passive diffusion, without use of artificial circulation, and subsequently discharge the sample to the μPHI device through the central outlet.

In one aspect, at least a portion of the array of microscale diffusion channels is disposed outward of the first collection material with respect to the central outlet.

In one aspect, the plurality of μPHI heating units comprises a first μPHI heating unit configured to heat a first portion of the second compartment and a second μPHI heating unit configured to heat a second portion of the second compartment. The first μPHI heating unit is configured to be actuated greater than or equal to about 50 ms to less than or equal to about 500 ms prior to the second μPHI heating unit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2A is a top view; and FIG. 2B is a side view;

FIG. 3A is a top view; and FIG. 3B is a side view;

FIG. 5A is a schematic view of the μPHI device; and FIG. 5B is a graphical view of heating unit pulses of the μPHI device during desorption;

Figure 6A:
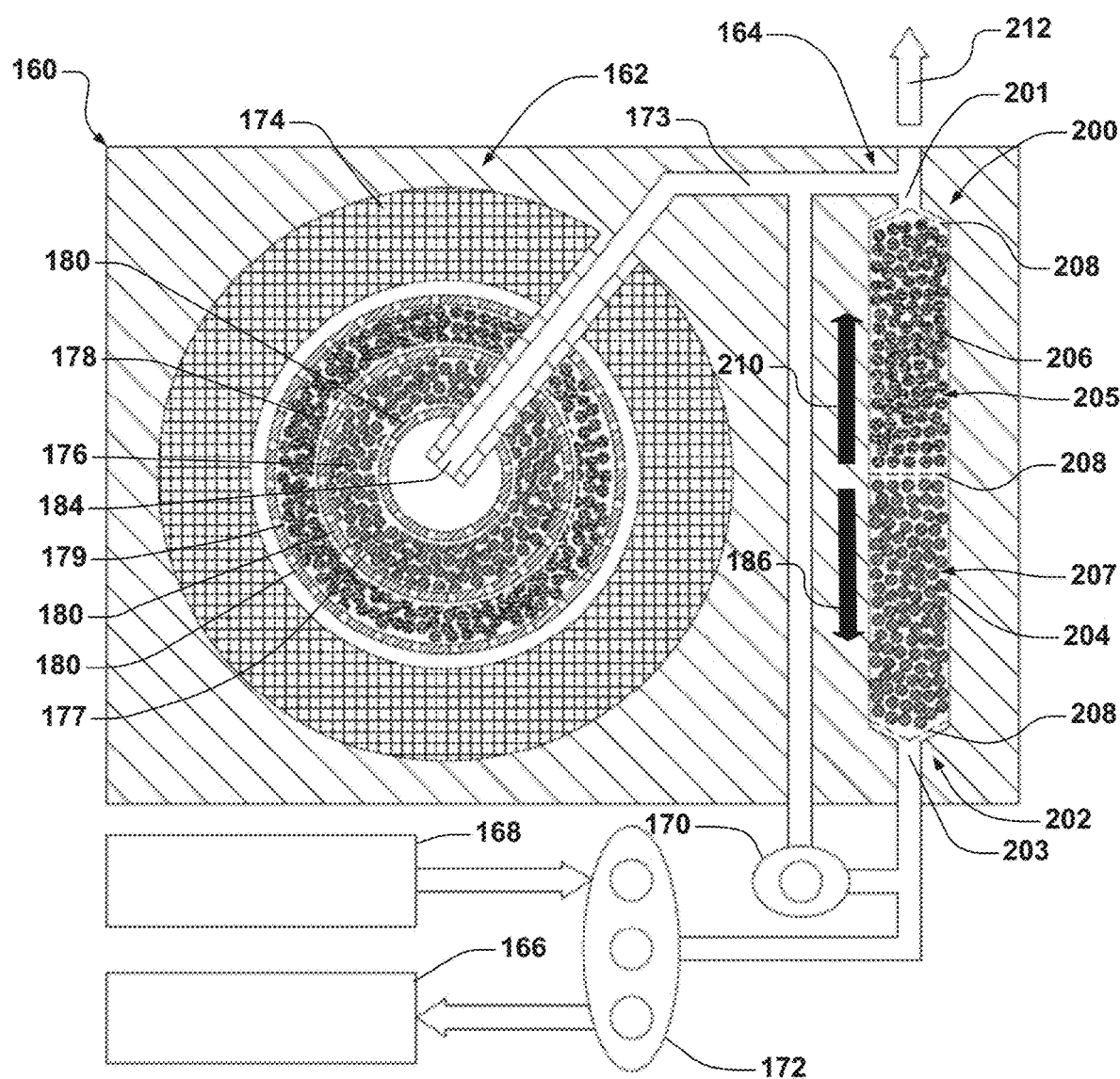
Figure 6B:
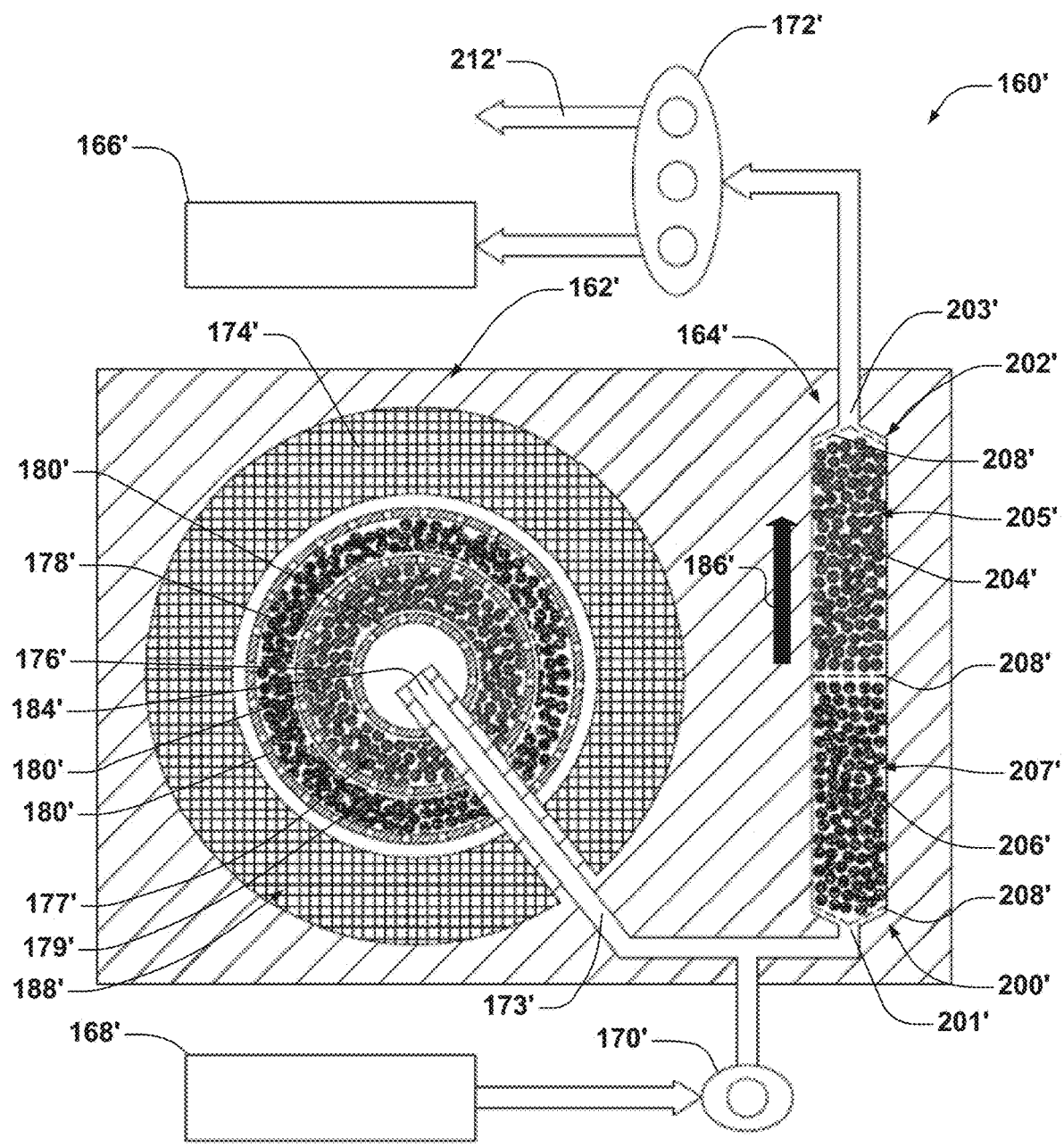
Figure 7:
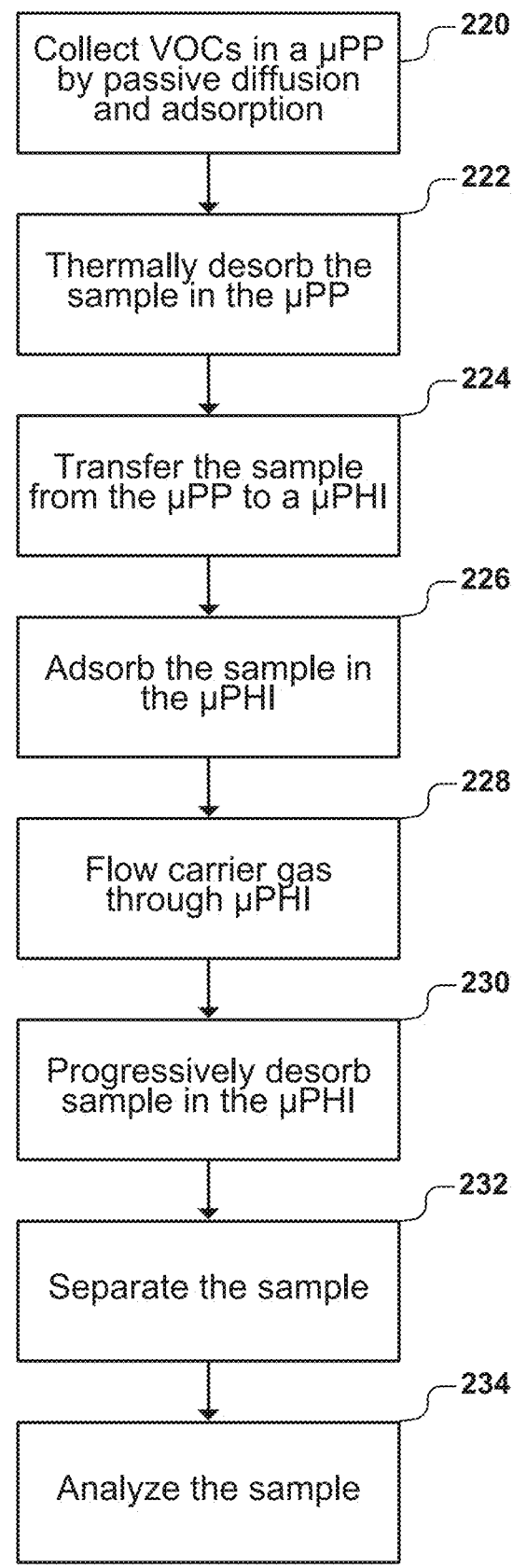
Figure 8A:
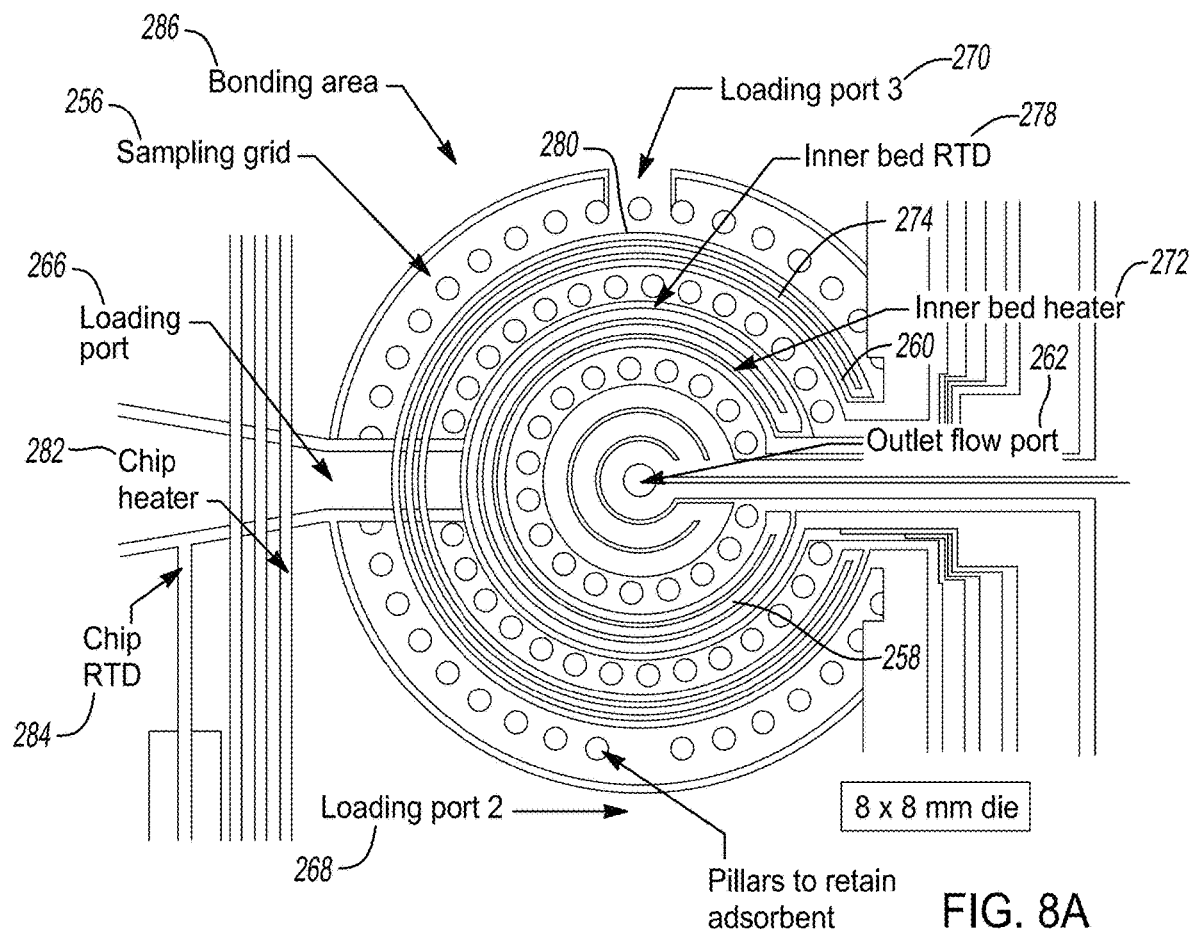
Figure 8B:
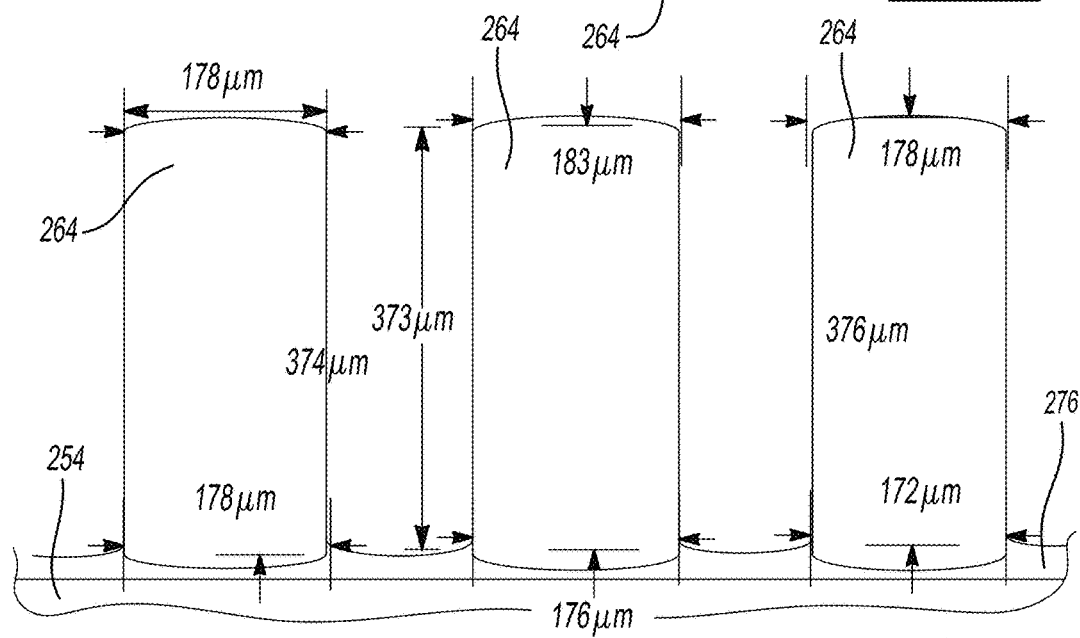
Figure 8C:
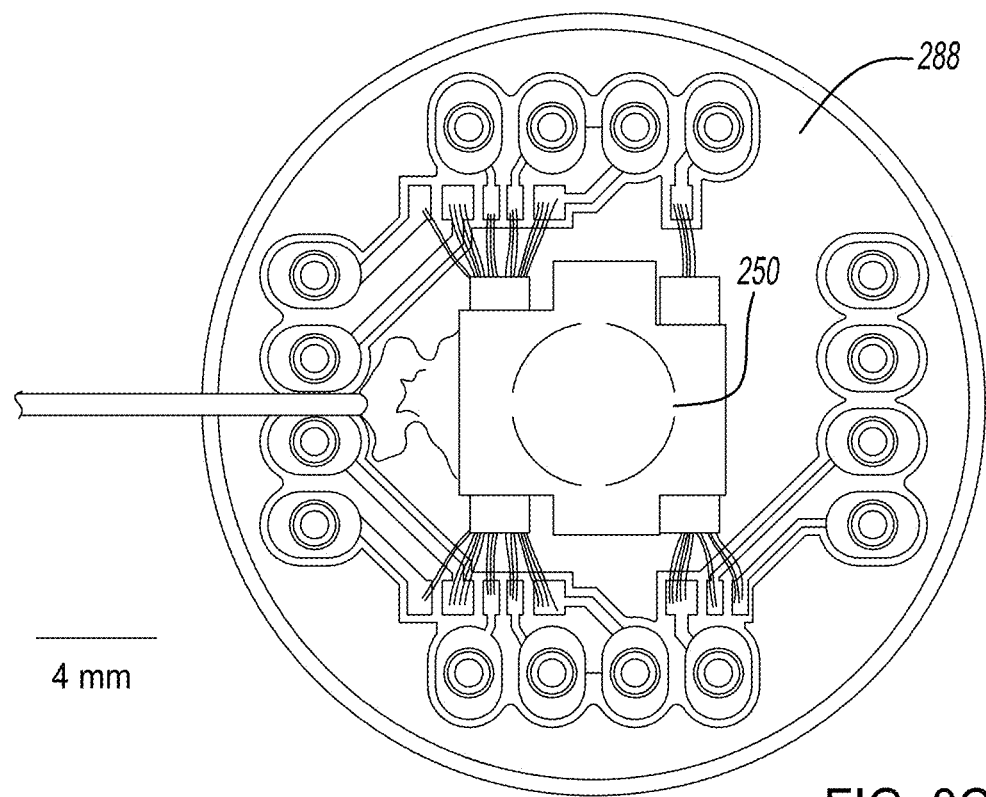
Figure 8D:
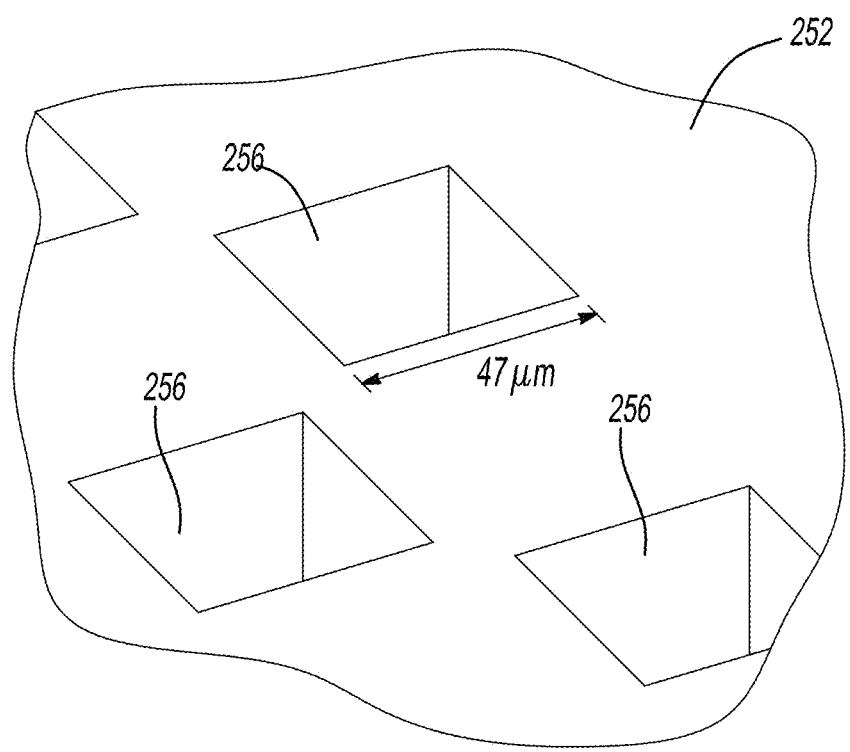
Figure 9A:
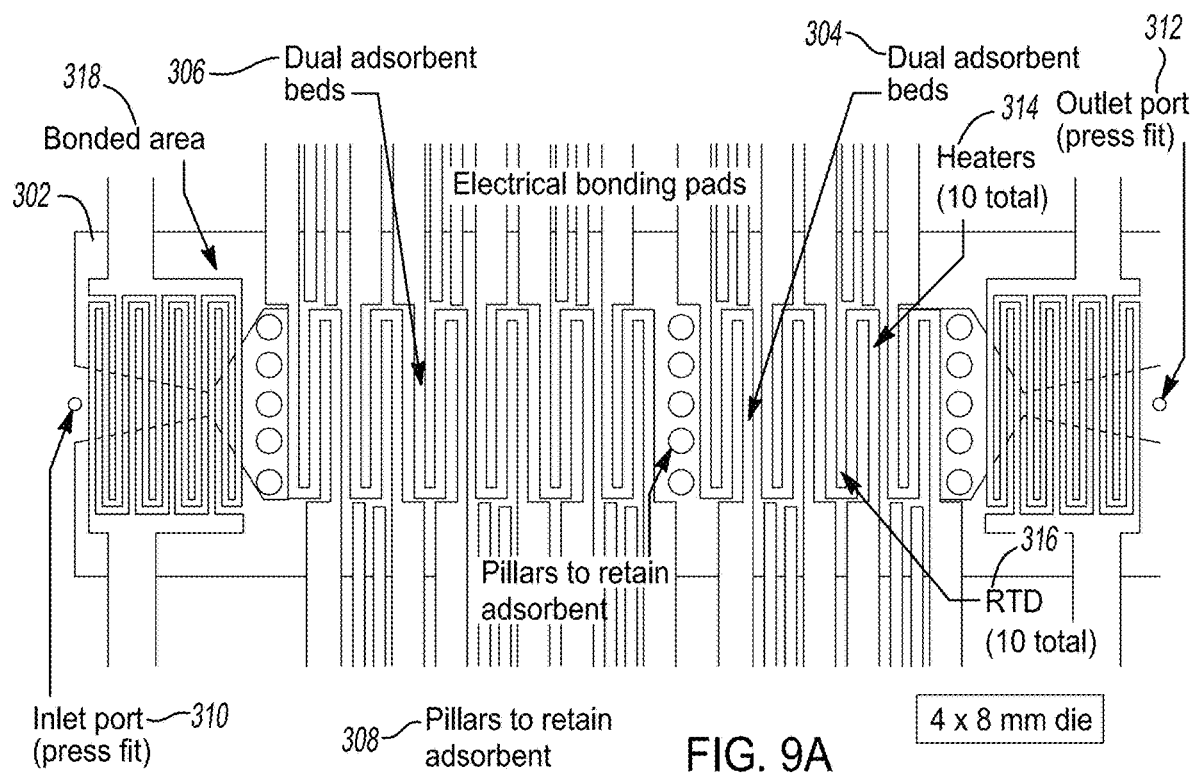
Figure 9B:
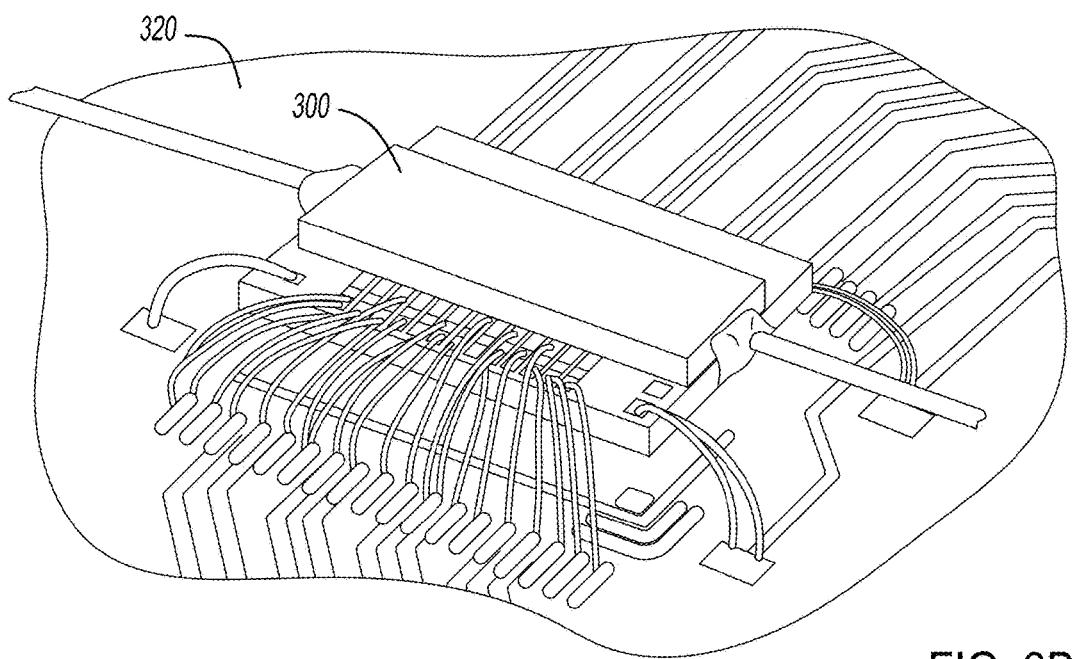
Figure 10:
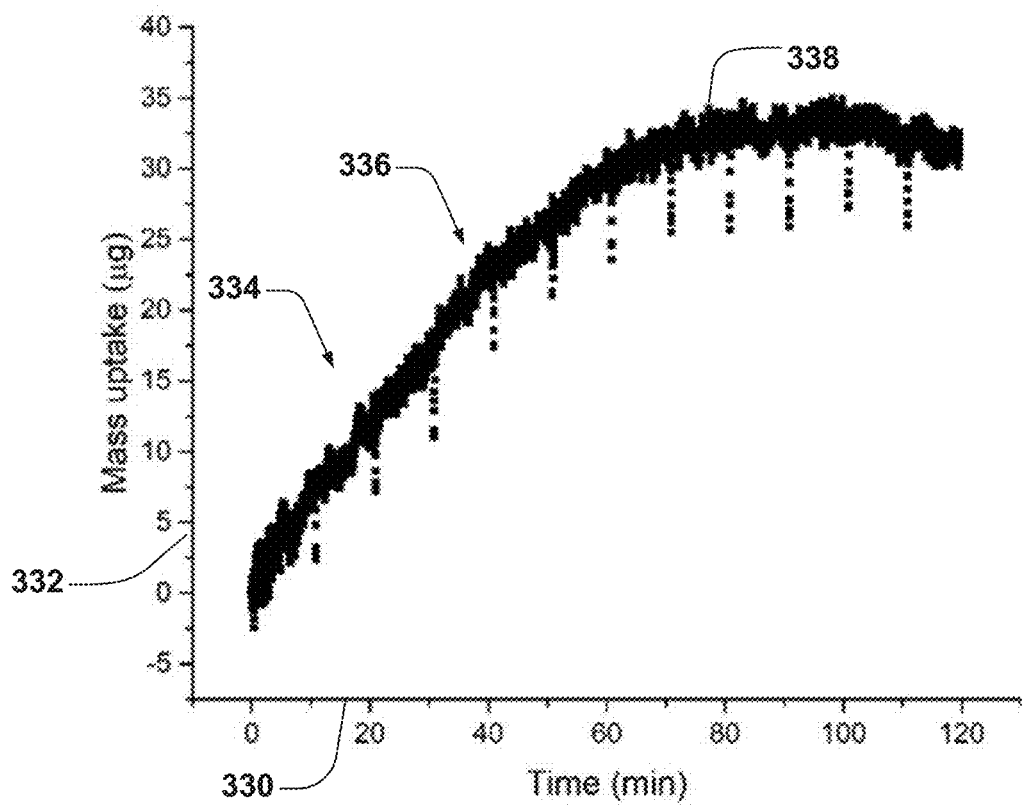
Figure 11:
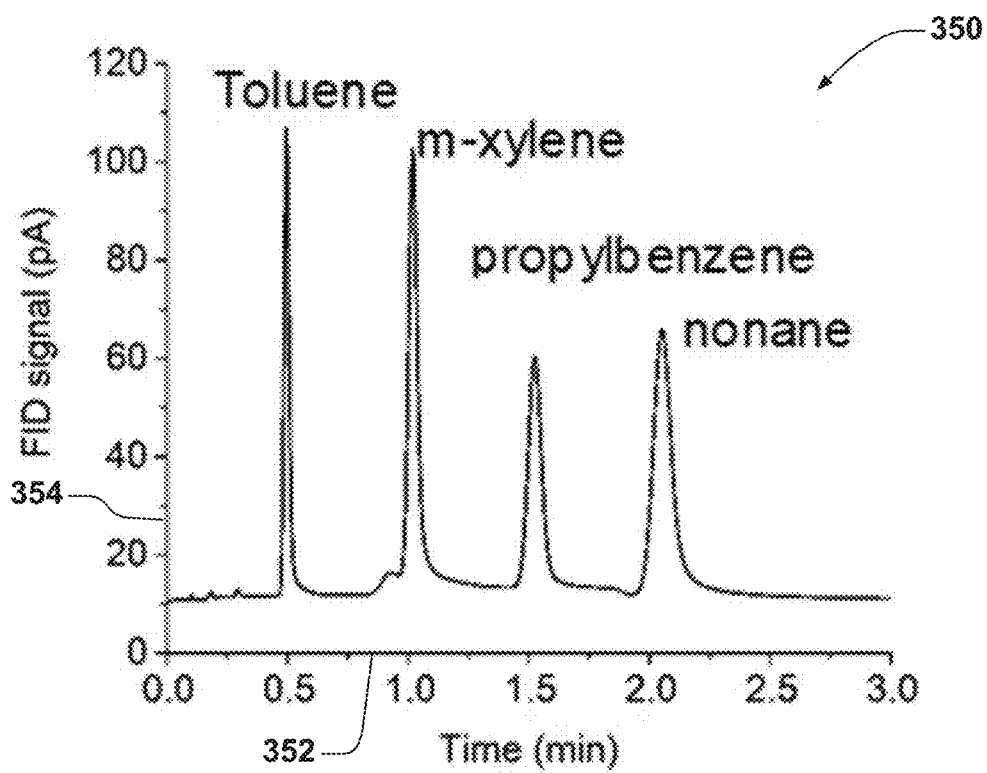
Figure 12:
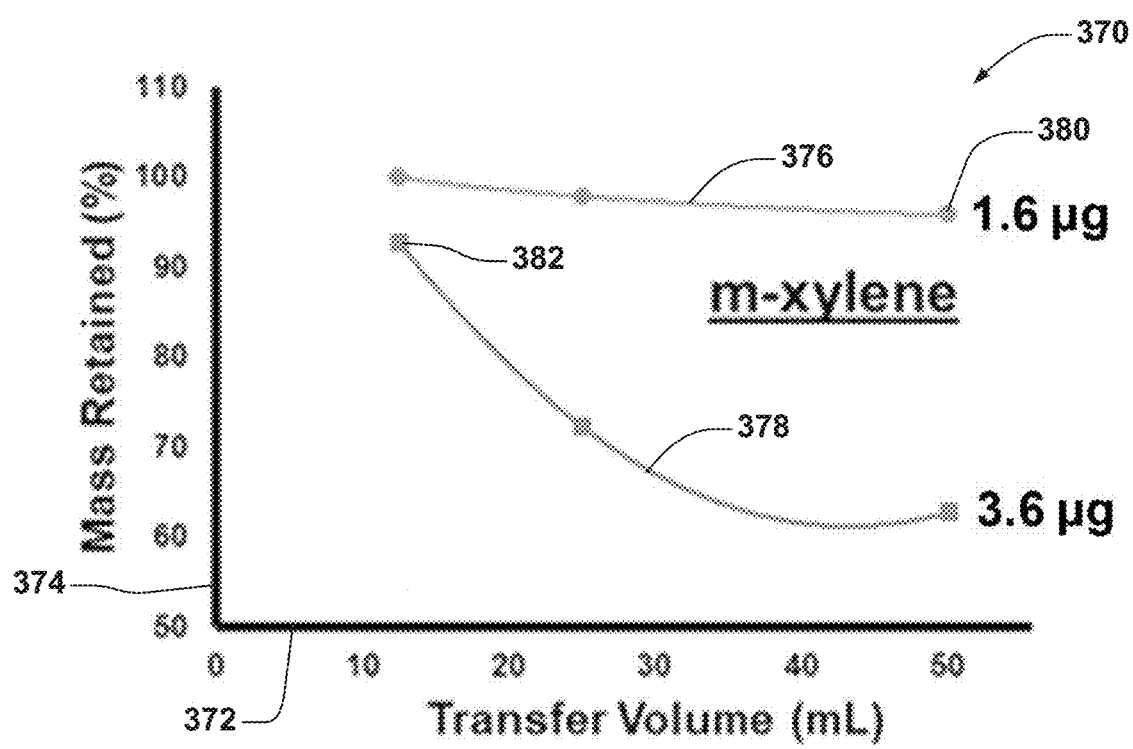
Figure 13:
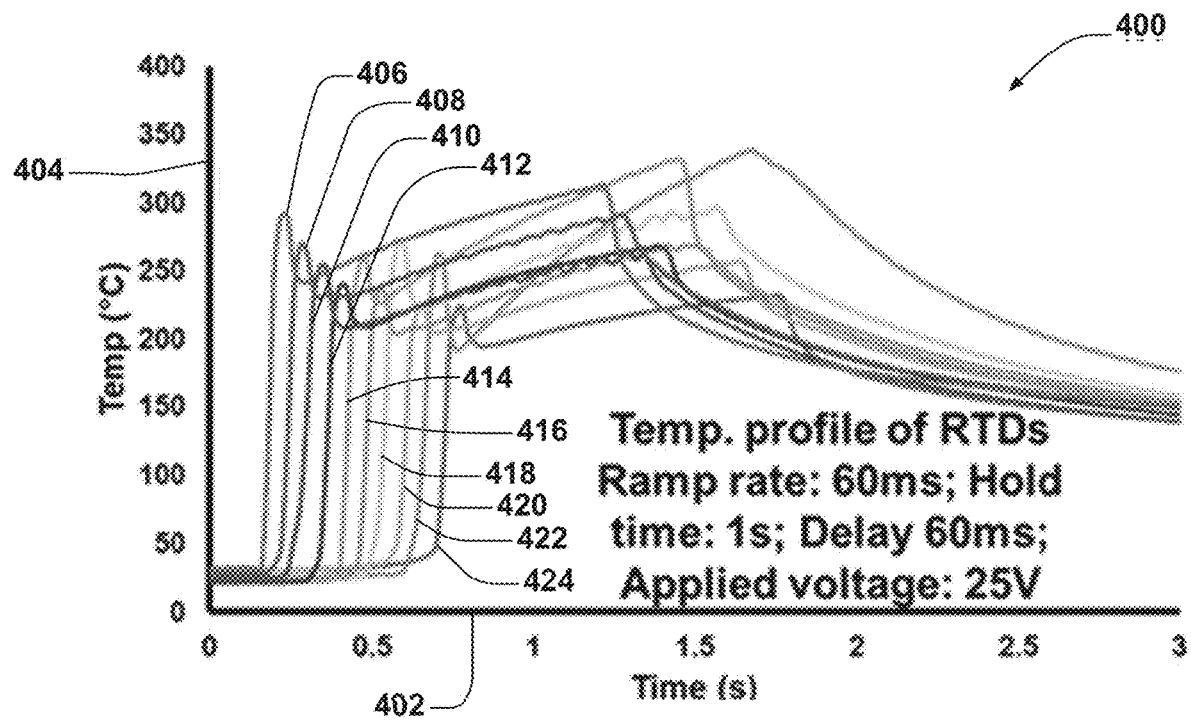
Figure 14:
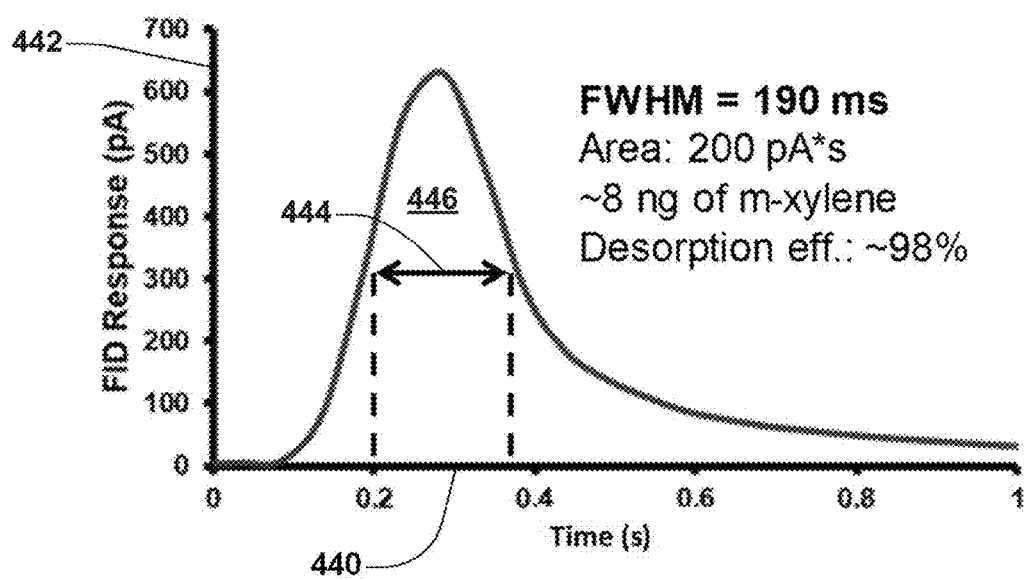

FIGS. 6A-6B are schematic views of μCOIN devices according to certain aspects of the present disclosure. FIG. 6A is a schematic view of a μCOIN device according to various aspects of the present disclosure, the μCOIN including a μPP device and a μPHI device. FIG. 6B is a schematic view of another μCOIN device according to various aspects of the present disclosure, the μCOIN including a μPP device and a microscale progressively-heated injector μPHI device;

FIG. 7 is a flow chart depicting an example method of detecting a component in the gas phase using the μCOIN device of FIG. 6A according to various aspects of the present disclosure;

FIGS. 8A-8D relate to μPP device according to various aspects of the present disclosure; FIG. 8A is an optical image of a portion of the μPP device; FIG. 8B is a scanning electron micrograph (SEM) image of pillars of the μPP device; FIG. 8C is an SEM image of microscale diffusion channels of the μPP device; and FIG. 8D is an optical image of the μPP device wire-bonded to a printed circuit board (PCB);

FIGS. 9A-9B relate to a μPHI device according to various aspects of the present disclosure; FIG. 9A is an optical image of a portion of the μPHI device; and FIG. 9B is an optical image of the μPHI device wire-bonded to a PCB;

FIG. 10 is a graphical representation of mass uptake as a function of time for m-xylene in the μPP device of FIGS. 8A-8D according to various aspects of the present disclosure;

FIG. 11 is a chromatogram for a 4-vapor mixture sampled by the μPP device of FIGS. 8A-8D according to various aspects of the present disclosure;

FIG. 12 is a fractional retention plot for m-xylene in the μPHI device of FIGS. 9A-9B according to various aspects of the present disclosure;

FIG. 13 is a temperature profile for ten μPHI RTD temperature sensors of the μPHI device of FIGS. 9A-9B according to various aspects of the present disclosure; and FIG. 14 is a graphical representation of an injection band discharged from the μPHI device of FIGS. 9A-9B according to various aspects of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

As noted above, a μGC system typically includes an accumulator or pre-concentrator, a sample injector, a separation column, and a detector. Some pre-concentrators also serve as injectors for transferring a sample to the separation column. These combination devices may be referred to as pre-concentrator-injectors. The dual function of pre-concentrator-injectors can result in tradeoffs between capacity, desorption efficiency, and power dissipation. Accordingly, for some devices, injection band widths of analytes are typically greater than 1 second, pre-concentration factors are relatively low, and power consumption is relatively high. The high power consumption may be caused, in part, by the use of a pump to draw air samples into the device.

Some pre-concentrator-injectors, referred to as microscale passive pre-concentrator-injector (µPPI) devices, may operate in a passive manner. As used herein, the term "passive" means that the diffusion of a sample into the µPPI device generally takes place at a known or quantifiable rate but without active or artificial circulation, such as using a pump or pumping means to circulate an air sample. Some µPPI devices are generally rectangular in shape and employ a substantially linear flow path for collection (e.g., during adsorption) and discharge (e.g., during discharge). For example, a sample may diffuse into the µPPI device through apertures or diffusion channels formed in a top portion, and semi-volatile or volatile organic components (referred to as "S/VOCs" or "components") be adsorbed onto a collection material. To remove the S/VOCs, the collection material may be heated to desorb the S/VOCs, which are pumped out of the µPPI in the substantially linear outlet path that is substantially perpendicular to the diffusion inlet path (i.e., through the inlet channels). At low suction pressures, however, a portion of the S/VOCs may back-diffuse through an inlet to the µPPI device and be lost. To counteract the back diffusion, the pump may be operated at a high flowrate. The S/VOCs may be discharged in a broad injection band resulting from heating characteristics, flow rate, and µPPI device layout.

Sharp injection bands may be particularly important in µGC systems because separation columns in µGC systems are typically short due to packaging requirements. Therefore, a focuser, such as a micro pre-concentrator focuser (µPCF) device, may accumulate the S/VOCs to generate a sharper injection band. The µPCF device may receive the S/VOCs, adsorb the S/VOCs onto a collection material, and heat the collection material to transfer (e.g., inject) the S/VOCs into the separation column. Heating the collection material may include heating an entire substrate, and therefore have significant power requirements. The µPCF may generate a sharper injection pulse than the µPPI alone. However, in some situations, it may be desirable to provide an even sharper injection band to the separation column.

In various aspects, the present disclosure provides a microscale collector-injector (µCOIN) device that is capable of both passive sampling and narrow injections. The µCOIN device includes a microscale passive pre-concentrator (µPP) device connected in series with a microscale progressively-heated injector (µPHI) device. The µPP device may passively collect samples and adsorb S/VOCs onto a collection material. The S/VOCs may be thermally desorbed by heating the collection material. Upon desorption, the S/VOCs are actively drawn radially inwardly (e.g., by a downstream pump), toward a central outlet. The radial flow path can significantly decrease a desorption flow rate necessary to minimize back-diffusion compared to the required flow rate in a linear device layout. The µPHI device may receive the S/VOCs from the µPP device. The S/VOCs are adsorbed onto a collection material in the µPHI device. The µPHI device includes a plurality of linearly-arranged heating units that are sequentially actuated to desorb and focus the S/VOCs into an ultra-sharp injection band for transfer to a downstream separation column. As will be discussed in greater detail below, the µCOIN device includes features that facilitate a reduction in power consumption compared to the predecessor devices. For example, the µCOIN may be operated up to 50 times per day for 2 years on battery power.

Figure 1:
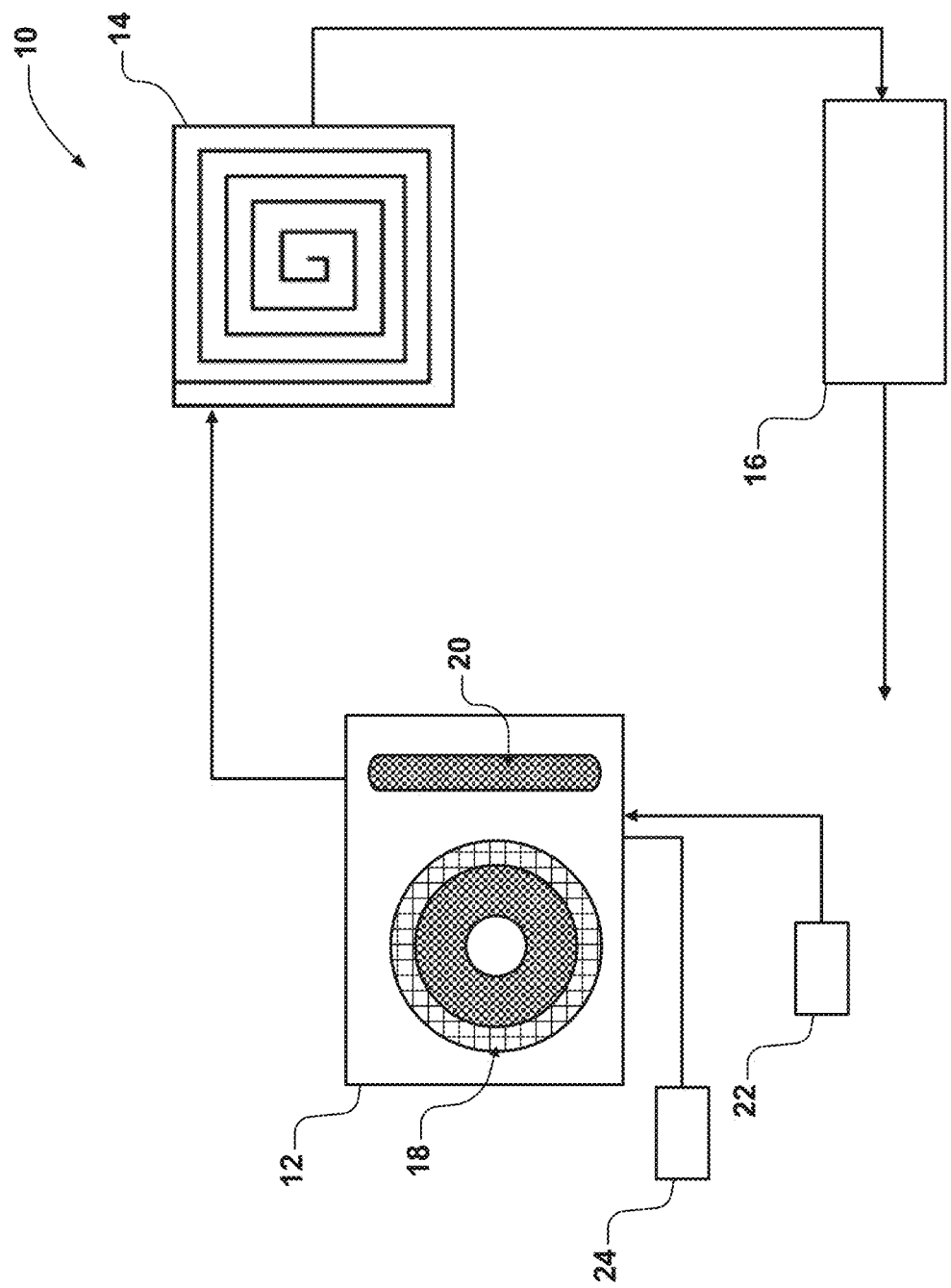
FIG. 1 is a schematic diagram of a microscale gas chromatograph system (μGC) including a microscale collector-injector (μCOIN) device according to various aspects of the present disclosure.

Referring to FIG. 1, a µGC system 10 according to various aspects of the present disclosure is provided. The µGC system 10 may include a µCOIN device 12, a micro-column 14, and a micro-sensor 16. The µCOIN device 12 may include a µPP 18 and a µPHI 20, which are fluidly connected to one another (connections not shown). The µPP 18 may generally capture a sample of gas and/or vapor compounds from the surrounding environment at a known rate by means of passive diffusion and collection techniques. The µPHI 20 may concentrate the sample for injection into the downstream micro-column 14. The micro-column 14 may generally separate the sample into different components. The micro-sensor 16 may detect the different components. The µCOIN device 12 device may be fluidly connected to a carrier gas source 22 to facilitate transferring the sample from the µCOIN device 12 to the micro-column 14. The µGC system 10 may include a pump 24 that is fluidly connected to the µPP 18 and the µPHI 20 to facilitate transferring the sample from the µPP 18 to the µPHI 20. The µGC system 10 may further include additional pumps and valves (not shown) as needed to facilitate transfer of the sample throughout other portions of the µGC system 10 and out of the µGC system 10.

Microscale Passive Pre-Concentrator (PP) Device (FIGS. 2A-3B)

Figures 2A, 2B:
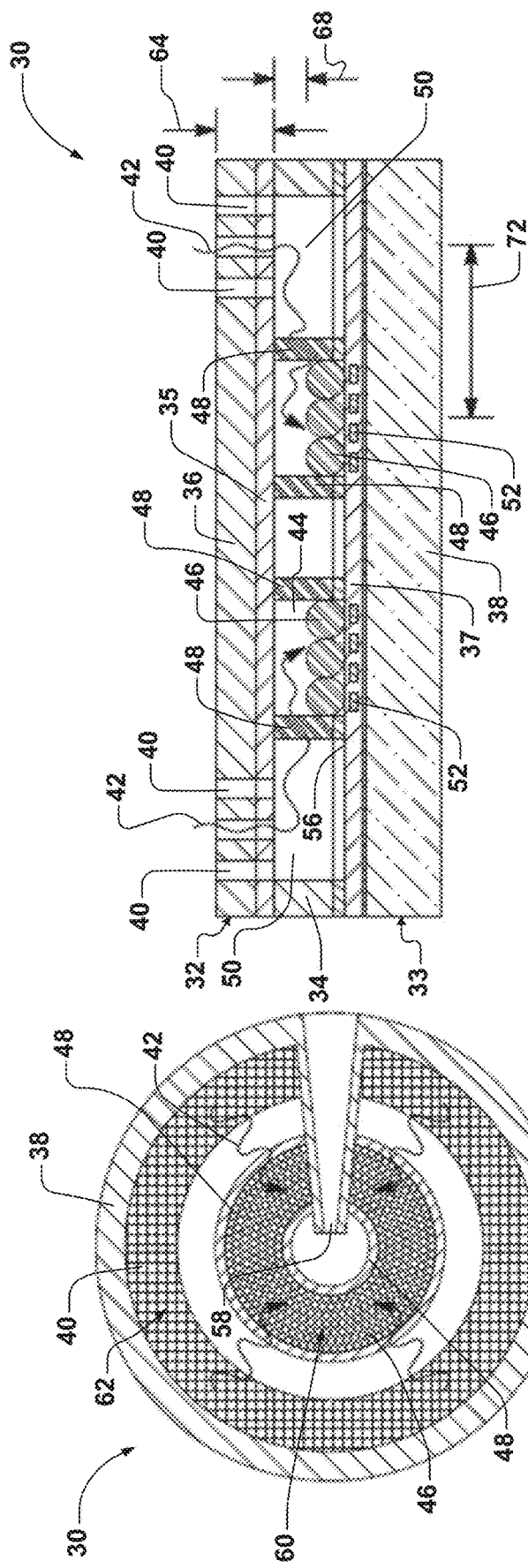
FIGS. 2A-2B are schematic views of a microscale passive pre-concentrator (μPP) device according to various aspects of the present disclosure, the μPP device undergoing adsorption.
Figure 3A:
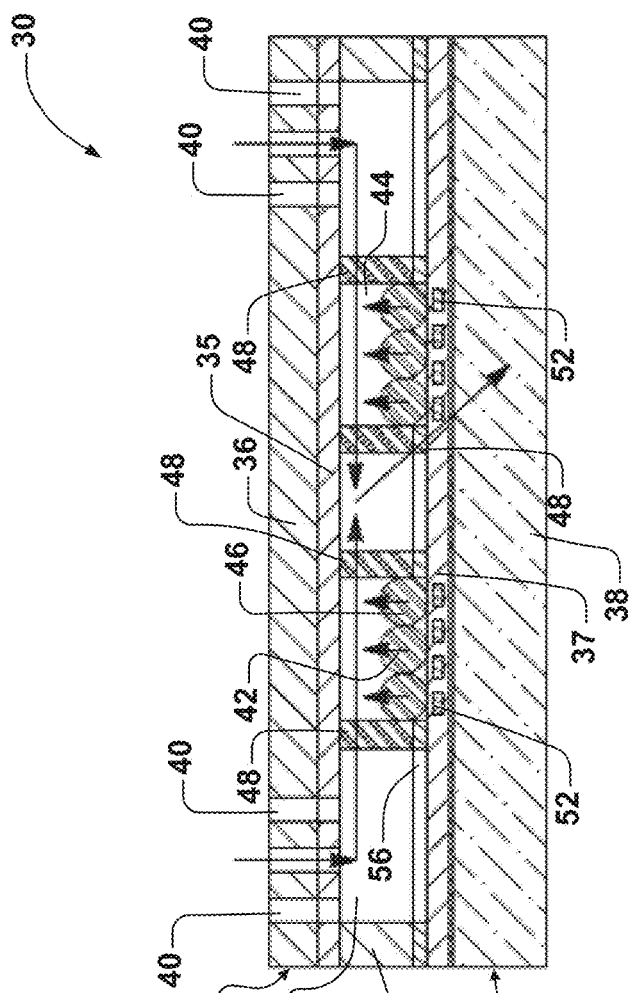
FIGS. 3A-3B are schematic views of the μPP device of FIGS. 2A-2B, the μPP device undergoing desorption.
Figure 3B:
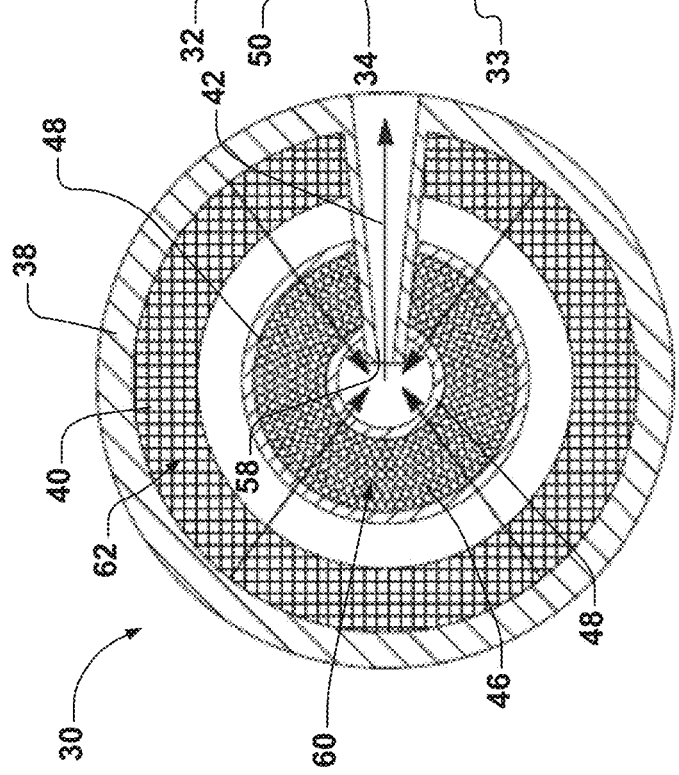

With reference to FIGS. 2A-3B, a µPP device 30 according to various aspects of the present disclosure is provided. The µPP device 30 may be configured to collect a sample of one or more S/VOCs, and discharge the S/VOCs to a downstream device (e.g., µPHI device 80 of FIGS. 4-5A). FIGS. 2A-2B depict collection of the S/VOCs, such as by adsorption, and FIGS. 3A-3B depict discharge of the S/VOCs, such as by desorption. The µPP device 30 may include a first or top substrate 32 (also referred to as a "first substrate portion") and a second or bottom substrate 33 (also referred to as a "second substrate portion"). In various aspects the top and bottom substrates 32, 33 may have a plate structure. The top and bottom substrates 32, 33 may be coupled to one another. By way of non-limiting example, the top and bottom substrates 32, 33 may be coupled to one another via eutectic bonding, anodic bonding, epoxy, or other compatible bonding methods.

In various aspects, the top substrate 32 may include a first inner portion or layer 34, a middle portion or layer 35, and a first outer portion or layer 36. The first inner layer 34 and the first outer layer 36 may comprise silicon. The middle layer 35 may comprise an insulator (e.g., silicon oxynitride (SiON)). The top substrate 32 may therefore be formed from silicon-on-insulator ("SOI"). The first inner layer 34 may be etched to form various features of the µPP device 30 (e.g., compartment 44, described below). The middle layer 35 may provide an etch stop during fabrication. The bottom substrate 33 may include a second inner portion or layer 37 and a second outer portion or layer 38. The second inner layer 37 may comprise an insulator (e.g., silicon oxynitride (SiON)). The second inner layer 37 may encapsulate other components of the µPP device 30 (e.g., heating units 52 or temperature sensors, discussed below). The second outer layer 38 may comprise glass. In various aspects, the first and second inner layers 34, 37 may be coupled to one another, with the first inner layer 34 forming a side wall of the µPP device 30. In various aspects, the top and bottom substrates 32, 33 may include different or additional layers. In one example, a top substrate includes two layers, with a first inner layer being insulating, and a bottom substrate includes three layers, with a second inner layer being configured to be etched during fabrication, and a middle layer being insulating and providing an etch stop during fabrication (not shown).

The top substrate 32 defines a plurality of apertures or microscale diffusion channels 40. A sample 42 may passively diffuse through the microscale diffusion channels 40 at a known rate according to Fick's laws, as will be described in greater detail below. The top and bottom substrates 32, 33 may cooperate to define a compartment 44. The compartment 44 may be in fluid communication with the microscale diffusion channels 40. In various aspects, the compartment 44 may include a cavity etched or otherwise formed in the top substrate 32 and/or a cavity etched or otherwise formed in the bottom substrate 33 (not shown). For example, the compartment 44 may be defined by the first inner layer 34, the middle layer 35, and the second inner layer 37. The compartment 44 may therefore be at least partially surrounded by insulating material.

A collection material 46 may be disposed within the compartment 44. In various aspects, the collection material 46 may be an adsorbent and the collection material 46 disposed within the compartment 44 may be referred to as an "adsorbent bed." The collection material 46 may be configured to capture gas-phase compounds within a first range of vapor pressures. In certain aspects, the collection material 46 may be porous. The collection material 46 may be free-flowing bulk adsorbent (e.g., granules), or deposited adsorbent (e.g., thick film or thin film). In certain aspects, the collection material 46 is selected from the group consisting of a thick-film adsorbent and a granular adsorbent. In some variations, the collection material 46 includes a plurality of adsorbent granules. The adsorbent granules may be present in more than a single layer. Accordingly, its use may facilitate a higher device capacity than those including a thin film adsorbent.

The μPP device 30 may further include a plurality of retention members, such as pillars 48. The pillars 48 may be spaced apart to permit the flow of S/VOCs and air into and out of the compartment 44. The pillars 48 may cooperate with the top and bottom substrates 32, 33 to retain the collection material 46 within the compartment 44. A head space 50 may be disposed between the collection material 46 and the microscale diffusion channels 40. In various aspects, the μPP device 30 may further include one or more loading ports (see, e.g., first, second, and third loading ports 266, 268, 270 of FIG. 8A) for insertion and removal of the collection material 46 from the compartment 44. The loading ports may be sealed after the collection material 46 is loaded into the compartment 44, such as with epoxy, by way of non-limiting example.

The μPP device 30 may further include a plurality of heating units 52 and temperature sensors (not shown) in thermal communication with the compartment 44. The heating units 52 may each comprise a compatible heating element, such as titanium/platinum (Ti/Pt). The temperature sensors may be resistance temperature devices (RTDs). The heating units 52 and temperature sensors may be embedded within the bottom substrate 33, such as within the second inner layer 37. Accordingly, the heating units 52 and temperature sensors may be thermally insulated from one another and other components of the μPP device 30, resulting in improved heating performance compared to non-insulated heating units. In various alternative aspects, the heating units 52 may be disposed on a top surface 56 of the second inner layer 37 of the bottom substrate 33 of the bottom substrate 33 (not shown). The heating units 52 may be located in a discrete region or regions, directly beneath the collection material 46. Therefore, the heating units 52 may be disposed across only a portion or portions of the second inner layer 37 of the bottom substrate 33. This discrete arrangement of heating units 52 may result in a power savings compared to a device having heating units disposed over an entire floor (not shown).

The μPP device 30 may be configured for inward diffusion or flow of air and S/VOCs. For example, the inward flow may be radially-inward flow. More particularly, components may enter the μPP device 30 via passive diffusion through the microscale diffusion channels 40, and continue to diffuse radially inward toward the collection material 46. The collection material 46 may at least partially surround a central outlet 58. The microscale diffusion channels 40 may at least partially surround the central outlet 58. In various aspects, the microscale diffusion channels 40 and the collection material 46 may be concentrically disposed about the central outlet 58. In various aspects, and as will be discussed in greater detail below, the μPP device 30 may include multiple collection materials (e.g., multiple adsorbent beds), such as two collection materials, three collection materials, or four collection materials, by way of non-limiting example. The multiple collection materials may be concentrically disposed about the central outlet 58 and with respect to one another (see, e.g., first and second collection materials 176, 178 of FIG. 6). Each collection material may be configured to capture compounds within a respective range of vapor pressures. The ranges of vapor pressures for the collection materials may be distinct, overlapping, or substantially the same.

The collection material 46 may be distributed within a first region 60 of the bottom substrate 33. The first region 60 may be coextensive with the compartment 44. In various aspects, the first region 60 may generally define an annulus or a portion of an annulus. The microscale diffusion channels 40 may be distributed across a second region 62 of the top substrate 32. The second region 62 may generally define a circle, a portion of a circle, an annulus, or a portion of an annulus. The second region 62 may be arranged so that it is not disposed directly over the first region 60. For example, at least a portion of the second region 62 may be disposed outward of the first region 60 with respect to the central outlet 58 to facilitate radially-inward diffusion of the S/VOCs. In various aspects, the first region 60 may be disposed at a first average distance (e.g., a first average radius) from the central outlet 58 and the second region 62 may be disposed at a second average distance (e.g., a second radius) from the central outlet 58. Although the first and second regions 60, 62 are shown as being generally annular, the regions may define other shapes that at least partially surround the central outlet 58 and facilitate inward flow from an outer portion (e.g., a periphery) of the μPP device 30 toward the central outlet 58. For example, the first region 60 and/or second region 62 may define semi-annular shapes.

μPP Device—Adsorption (FIGS. 2A-2B)

In various aspects, the μPP device 30 relies on the diffusion of S/VOCs down a concentration gradient created within the μPP device 30 by arranging an adsorbent trap (e.g., the collection material 46) in the compartment 44, which is substantially stagnant, open to the ambient, and disposed downstream of the microscale diffusion channels 40. Assuming that the concentration of S/VOCs is effectively zero at a surface of the trap, the diffusional sampling rate is given by the following equation, derived from Fick's first law of diffusion:

$$S = \frac{DA}{L} = \frac{m}{Ct} \quad \text{(eqn. 1)}$$

where D is the diffusion coefficient of the vapor (cm$^2$/s), A is the cross-sectional area of the microscale diffusion channels 40 (cm$^2$), L is the length of the diffusion path within the sampler (cm), C is the ambient vapor concentration (µg/cm$^3$), and m is the mass of vapor (g) captured over the sampling time, t (s). In the absence of turbulence, S is directly proportional to A and inversely proportional to L. It is theoretically possible to scale down the size of the sampler while keeping S constant by maintaining a constant L/A ratio.

A diffusion path for a sample entering the µPP device 30 includes three segments, each having a specific length $L_i$ and area $A_i$ through which the mass transfer of vapors is constant at steady state. A first segment is defined by the microscale diffusion channels 40. The first segment has a first length 64 ($L_1$) and a first area ($A_1$). The first length 64 is defined by a length of the microscale diffusion channels 40 and the first area is defined by a total cross-sectional area (substantially perpendicular to $L_i$) of the microscale diffusion channels 40. A second segment is defined by the head space 50, and has a second length 68 ($L_2$) and a second area ($A_2$). A third segment having a third length 72 ($L_3$) and a third area ($A_3$) is defined between the microscale diffusion channels 40 and the collection material 46 (e.g., in a radially-inward direction). In one example, the third length 72 is a difference between the second average distance (microscale diffusion channels 40 to central outlet 58) and the first average distance (collection material 46 to central outlet 58). For the µPP device 30 of FIGS. 2A-3B, the sampling rate may be estimated as:

$$S = \frac{D}{\frac{L_1}{A_1} + \frac{L_2}{A_2} + \frac{L_3}{A_3}} \quad \text{(eqn. 2)}$$

At low S/VOC concentrations and sub-monolayer coverage of the adsorption sites on the collection material 46, the amount of S/VOCs adsorbed to the surface of a granular adsorbent at equilibrium is proportional to the air concentration of the S/VOCs. It can be expressed as the equilibrium adsorption capacity, $W_e$, which is the ratio of the mass of adsorbed components to the mass of adsorbent material. As a monolayer is approached, $W_e$ no longer increases in proportion to the air concentration of the S/VOC, and at a full monolayer $W_e$ reaches a constant value. In the sub-monolayer regime, the collection material 46 serves as an effective component trap and the concentration of components near the surface can be assumed to be close to zero, so that the sampling rate is governed by Equation 1 or Equation 2, above. As the sites on the adsorbent gradually become occupied, the trapping efficiency is expected to decrease along with the sampling rate. The point at which the sampling rate decreases significantly is a function of time and the component concentration, and it defines the effective capacity or service life. Therefore, the capacity of the µPP device 30 is a function of its design, the collection materials 46 (e.g., composition, structure, and mass), and the nature and quantity of S/VOCs at the time of exposure. Capacity of the µPP device 30 for a particular S/VOC is dependent on S/VOC polarity and vapor pressure. In one example, the µPP device 30 may have a capacity for m-xylene of greater than or equal to about 30 µg, and optionally greater than or equal to about 500 µg, which can vary based on types and mass of collection materials 46 (e.g., adsorbents) used in the µPP device 30. The µPP device 30 may collect the S/VOCs with zero expended power throughout the sampling cycle.

µPP Device—Desorption (FIGS. 3A-3B)

When the collection material 46 is an adsorbent, the sample 42 is desorbed for analysis after the sampling period is completed. The S/VOCs may be removed thermally, such as by heating the collection material 46 in situ and drawing the released S/VOCs downstream (i.e., inward) toward the central outlet 58, and then to other components by means of a small pump (see, e.g., the pump 24 of FIG. 1, pump 166 of FIG. 6A, pump 166' of FIG. 6B). As a result of the radially-inward flow configuration of the µPP device 30, the pump pulls substantially evenly from all directions, thereby improving flow uniformity compared to linear flow devices (e.g., a µPPI device). This arrangement reduces the loss mechanism through the microscale diffusion channels 40. In various aspects, the pump flow rate necessary to significantly reduce or prevent back-flow out the microscale diffusion channels 40 may be greater than or equal to about 10 times less than in a linearly arranged device (e.g., a µPPI device). Accordingly, the radial flow arrangement of the µPP device 30 may reduce or minimize energy consumption compared to linear flow devices. Desorption efficiency is a function of desorption temperature, desorption time, and desorption flow rate. For certain S/VOCs, desorption efficiency may approach 100%. Thus, for some S/VOCs, desorption efficiency may be greater than about 70%, optionally greater than or equal to about 75%, optionally greater than or equal to about 80%, optionally greater than or equal to about 85%, optionally greater than or equal to about 90%, optionally greater than or equal to about 95%, and optionally greater than or equal to about 99%.

Figure 4:
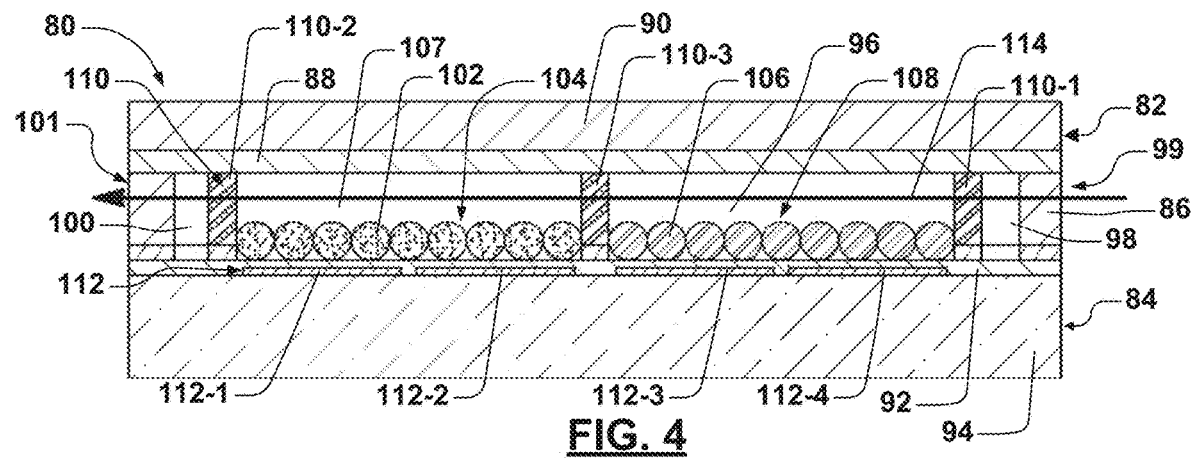
FIG. 4 is a schematic view of a microscale progressively-heated injector (μPHI) device according to various aspects of the present disclosure, the μPHI device undergoing adsorption.
Figure 5A:
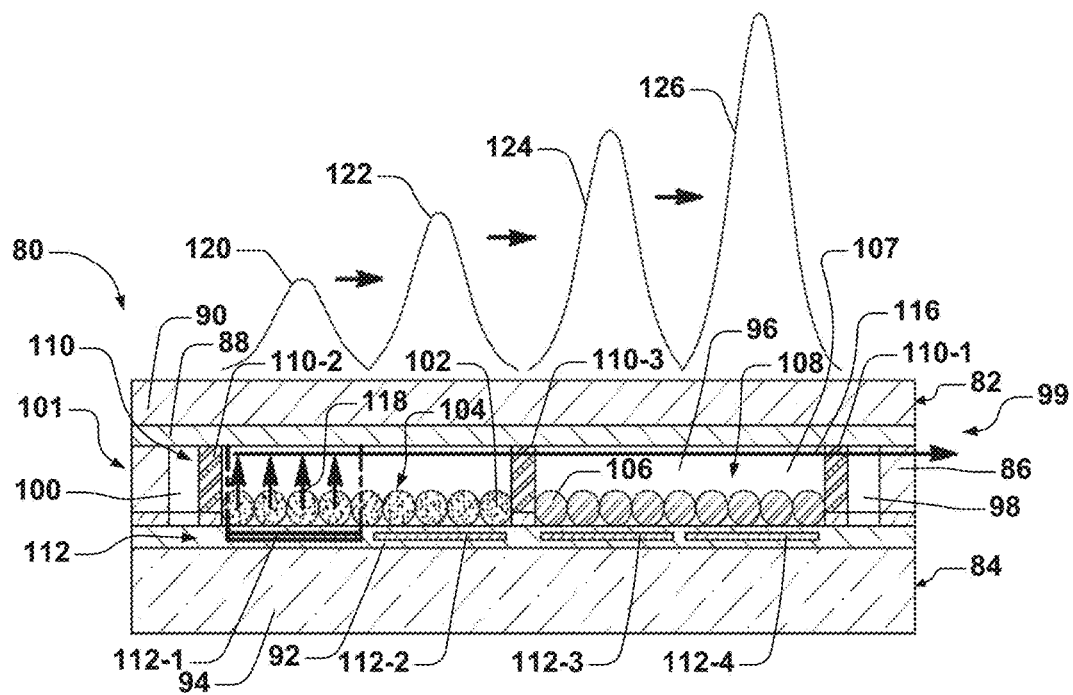
FIGS. 5A-5B are related to desorption of the μPHI device of FIG. 4.
Figure 5B:
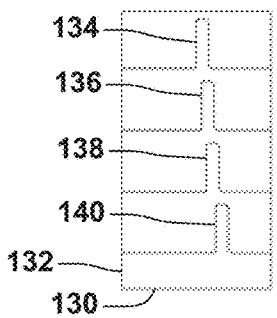

Microscale Progressively-Heated Injector (PHI) Device (FIGS. 4-5B)

With reference to FIGS. 4-5B, a µPHI device 80 according to various aspects of the present disclosure is provided. The µPHI device 80 may be configured to receive a sample including S/VOCs from another device (e.g., the µPP device 30 of FIGS. 2A-3B), and discharge the sample at a flow rate compatible with downstream components, such as a separation column. The µPHI device 80 may include a first or top substrate 82 (also referred to as a "third substrate portion") and a second or bottom substrate 84 (also referred to as a "fourth substrate portion"). The top and bottom substrates 82, 84 may be coupled to one another, such as by eutectic bonding, anodic bonding, epoxy, or other compatible bonding methods.

In various aspects, the top substrate 82 may include a first inner portion or layer 86, a middle portion or layer 88, and a first outer portion or layer 90. The first inner layer 86 and the first outer layer 90 may comprise silicon. The middle layer 88 may comprise an insulator (e.g., silicon oxynitride (SiON)). The top substrate 82 may therefore be formed from silicon-on-insulator ("SOI"). The first inner layer 86 may be etched to form various features of the µPHI device 80 (e.g., compartment 96, described below). The middle layer 88 may provide an etch stop during fabrication. The bottom substrate 84 may include a second inner portion or layer 92 and a second outer portion or layer 94. The second inner layer 92 may be formed from an insulator (e.g., silicon oxynitride (SiON)). The second inner layer 92 may encapsulate other components of the μPHI device 80 (e.g., heating units 112 and temperature sensors, discussed in greater detail below). The second outer layer 94 may comprise glass. In various aspects, the first and second inner layers 86, 92 may be coupled to one another, with the first inner layer 86 forming a side wall of the μPHI device 80. In various aspects, the top and bottom substrates 82, 84 may include different or additional layers. In one example, a top substrate includes two layers, with a first inner layer being insulating, and a bottom substrate includes three layers, with a second inner layer being configured to be etched during fabrication, and a middle layer being insulating and providing an etch stop during fabrication (not shown).

The top and bottom substrates 82, 84 may cooperate to define a compartment 96. In various aspects, the compartment 96 may include a cavity etched or otherwise formed in the top substrate 82 and/or a cavity etched or otherwise formed in the bottom substrate 84. For example, the compartment 96 may be defined by the first inner layer 86, the middle layer 88, and the second inner layer 92. The compartment 96 may therefore be at least partially surrounded by insulating material.

The μPHI device 80 may include a primary port 98 disposed at a first end 99 of the μPHI device 80 and a secondary port 100 disposed at a second end 101 of the μPHI device 80. Both the primary and secondary ports 98, 100 may be in fluid communication with the compartment 96. In various aspects, the μPHI device 80 may further include one or more loading ports (not shown) for insertion and removal of the first and second collection materials 102, 106 from the compartment 96. The loading ports may be sealed after the first and second collection materials 102, 106 are loaded into the compartment 96, such as with epoxy, by way of non-limiting example. The μPHI device 80 may be configured for substantially linear flow.

The μPHI device 80 may further include a first collection material 102 disposed in a first sub-compartment or region 104, and a second collection material 106 disposed in a second sub-compartment or region 108. The first collection material 102 may be configured to capture gas-phase compounds within a first range of vapor pressures. The second collection material 106 may be configured to capture gas-phase compounds within a second range of vapor pressures. In certain aspects, the second range of vapor pressures may be different from the first range of vapor pressures. The second sub-compartment 108 may be disposed adjacent to the first end 99, and the first sub-compartment 104 may be disposed adjacent to the second end 101. A head space 107 may be provided above the first and second collection materials 102, 106.

In certain aspects, the first and second collection materials 102, 106 may be porous. The first and second collection materials 102, 106 may be free-flowing bulk adsorbent (e.g., granules) or deposited adsorbent (e.g., thick film or thin film). In certain aspects, the first and second collection materials 102, 106 may be independently selected from the group consisting of a thick-film adsorbent and a granular adsorbent. The adsorbent granules may be present in more than a single layer. Accordingly, its use may facilitate a higher device capacity than those including a thin film adsorbent.

In some variations, the first collection material 102 may comprise a first plurality of adsorbent granules. The adsorbent granules of the first plurality may define a first average specific surface area. The second collection material 106 may comprise a second plurality of adsorbent granules. The adsorbent granules of the second plurality may define a second average specific surface area. The first and second average specific surface areas may be distinct. For example, the second average specific surface area may be less than the first average specific surface area. Lower volatility components may adsorb onto the second collection material 106. Higher volatility components may adsorb onto the first collection material 102. In various alternative aspects, the μPHI device 80 may include a single collection material, or more than two collection materials, such as three collection materials or four collection materials (not shown). Each collection material may be configured to capture gas-phase components within a respective range of vapor pressures.

The μPHI device 80 may further include a plurality of retention members, such as pillars 110. The pillars 110 may cooperate with the top and bottom substrates 82, 84 to retain the first and second collection materials 102, 106 within the compartment 96. The pillars 110 may provide a physical barrier between the first and second collection materials 102, 106 in the compartment 96, thereby dividing the compartment 96 into the first and second sub-compartments 104, 108. A first portion 110-1 of the pillars 110 may be disposed between the first end 99 of the μPHI device 80 and the second collection material 106. A second portion 110-2 of the pillars 110 may be disposed between the first collection material 102 and the second end 101 of the μPHI device 80. A third portion 110-3 of the pillars 110 may be disposed between the first collection material 102 and the second collection material 106.

The μPHI device 80 may further comprise a plurality of heating units 112 and temperature sensors (not shown). The heating units 112 may be similar to the heating units 52 of the μPP device 30 of FIGS. 2A-3B. The heating units 112 are in thermal communication with the bottom substrate 84 and configured to heat the compartment 96. For example, the heating units 112 may be disposed directly below the first and second collection materials 102, 106. The heating units 112 may be thermally isolated from one another. The heating units 112 may be configured to individually heat respective portions of the compartment 96. The heating units may be operated sequentially or concurrently. In various aspects, the heating units 112 may be disposed in discrete regions below the collection materials 102, 106. Accordingly, the μPHI device 80 may require a lower power than devices that heat an entire substrate or substantially an entire substrate. In various aspects, the second outer layer 94 may be relatively thin (e.g., a membrane) to enhance thermal isolation and further reduce power by reducing thermal mass beneath the heating units.

The plurality of heating units 112 may include greater than two heating units, optionally greater than or equal to five heating units, optionally greater than or equal to 10 heating units, or optionally greater or equal to than 15 heating units. In certain aspects, the plurality of heating units 112 may include less than or equal to 50 heating units, optionally less than or equal to 30 heating units, optionally less than or equal to 25 heating units, optionally less than or equal to 20 heating units, or optionally less than or equal to 15 heating units. For example, the plurality of heating units 112 may include greater than or equal to 2 heating units to less than or equal to 30 heating units, optionally greater than or equal to 5 heating units to less than or equal to 20 heating units, or optionally greater than or equal to 10 to less than or equal to fifteen heating units. In certain variations, the μPHI device 80 may include fewer heating units than other injection devices, despite having a smaller footprint (e.g., through use of a relatively greater adsorbent volume per footprint area). Accordingly, the μPHI device 80 may require less power than other injection devices.

μPHI Device—Adsorption (FIG. 4)

Referring to FIG. 4, the μPHI device 80 may be configured to receive the sample via the primary port 98. The sample may be pumped into the compartment 96. The sample may flow into the compartment 96 in a first direction 114 (i.e., from the first end 99 to the second end 101). Therefore, during adsorption, the second collection material 106 is disposed upstream of the first collection material 102. As noted above, lower volatility components may generally adsorb on the second collection material 106 in the second sub-compartment 108 and higher volatility components may generally adsorb on the first collection material 102 in the first sub-compartment 104. In various aspects, the μPHI device 80 may have a capacity of greater than or equal to about 1 μg, optionally greater than or equal to about 4 μg, optionally greater than or equal to about 10 μg, optionally greater than or equal to about 15 μg, and optionally greater than or equal to about 20 μg.

μPHI Device—Desorption (FIGS. 5A-5B)

With reference to FIGS. 5A-5B, during desorption, a carrier gas, such as helium, is flushed through the compartment 96 in a second direction 116 opposite the first direction 114 (FIG. 4). In various aspects, this process may be referred to as "back flushing." Accordingly, during desorption, the first collection material 102 is disposed upstream of the second collection material 106. However, in various alternative aspects, during desorption, the carrier gas may be flushed through the compartment 96 in the first direction 114, referred to as "forward flushing" (see, e.g., FIG. 6B). During forward flushing, the second collection material 106 is disposed upstream of the first collection material 102 (not shown). The use of forward flushing may simplify a valving arrangement in a μGC system that includes the μPHI device 80.

Returning to FIGS. 5A-5B, as the carrier gas flows through the compartment 96 during desorption, the heating units 112 are sequentially actuated to concentrate the S/VOCs and provide a sharp injection band to a downstream component. However, in various alternative aspects, all or a portion of the heating units 112 may be actuated concurrently. In one example of sequential operation, the heating units 112 are actuated beginning with a first heating unit 112-1 that is disposed adjacent to the second end 101. Thus, the first heating unit 112-1 is disposed upstream of the other heating units 112 during desorption. Actuation of the first heating unit 112-1 causes S/VOCs to desorb from a portion of the first collection material 102 that is disposed above the first heating unit 112-1, as indicated at 118. A graphical representation of concentration of S/VOCS above the first heating unit is shown at the first curve 120. After desorption from the first heating unit 112-1, the S/VOCs flow in the second direction 116 together with the carrier gas. A second heating unit 112-2 is actuated to desorb S/VOCs from the first collection material 102 over the second heating unit 112-2. A graphical representation of the S/VOCs above the second heating unit 112-2 is shown by a second curve 122. After desorption from the second heating unit 112-2, the S/VOCs flow in the second direction 116 together with the carrier gas. A third heating unit 112-3 is actuated to desorb S/VOCs from the second collection material 106 over the third heating unit 112-3. A graphical representation of the S/VOCs above the third heating unit 112-3 is shown by a third curve 124. After desorption from the third heating unit 112-3, the S/VOCs flow in the second direction 116 together with the carrier gas. A fourth heating unit 112-4 is actuated to desorb S/VOCs from the second collection material 106 over the fourth heating unit 112-4. A graphical representation of the S/VOCs above the fourth heating unit 112-4 is shown by a fourth curve 126. During forward flushing, the heating units 112 may be actuated in the opposite order.

The sequentially-actuated heating units 112 may facilitate the formation of a sharp injection pulse. In various aspects, the μPHI device 80 may be configured to generate a full width at half maximum injection band width of less than or equal to about 500 ms, optionally less than or equal to about 400 ms, optionally less than or equal to about 300 ms, optionally less than or equal to about 250 ms, optionally less than or equal to about 200 ms, optionally less than or equal to about 150 ms, optionally less than or equal to about 100 ms, and optionally less than or equal to about 50 ms.

In various aspects, the sequential actuation of the heating units 112 may be referred to as "rolling up" or "focusing." The injection band width can be optimized by varying the carrier gas flow rate, heating unit temperature, and/or delay time. The delay time is a duration of time between sequential pulses of adjacent heating units 112. An example operation of the heating units 112 is depicted in FIG. 5B, where an x-axis 130 represents time and a y-axis 132 represents power. A first pulse 134 corresponds to the first heating unit 112-1, a second pulse 136 corresponds to the second heating unit 112-2, a third pulse 138 corresponds to the third heating unit 112-3, and a fourth pulse 140 corresponds to the fourth heating unit 112-4.

The μPHI device 80 includes four heating units 112 and two collection materials 102, 106, with the first and second heating units 112-1, 112-2 being disposed under the first collection material 102, and the third and fourth heating units being disposed under the second collection material 106.

As discussed above, the discrete distributions of heating units 112 may minimize the power require by the heating units 112 to desorb the S/VOCs. The power required is dependent upon the specific S/VOCs being desorbed. In various aspects, the desorption process may be performed at greater than or equal to about 5 joules to less than or equal to about 200 joules, and optionally about 20 joules. In various aspects, the desorption process may be performed at less than or equal to about 200 joules, optionally less than or equal to about 150 joules, optionally less than or equal to about 100 joules, optionally less than or equal to about 75 joules, optionally less than or equal to about 50 joules, optionally less than or equal to about 40 joules, optionally less than or equal to about 30 joules, and optionally less than or equal to about 20 joules.

Integrated Microscale Collector-Injector (COIN) Devices (FIGS. 6A-6B)

With reference to FIG. 6A, a μCOIN device 160 according to various aspects of the present disclosure is provided (shown schematically). The μCOIN device 160 includes integrated μPP 162 and μPHI 164 components. The μPP 162 and the μPHI 164 are fluidly connected in series, with the μPHI 164 being disposed downstream of the μPP 162. The μPP 162 and the μPHI 164 may be integrated onto a single microchip, as shown. In various alternative embodiments, the μPP 162 and the μPHI 164 may be discrete devices that are fluidly connected to one another in series (not shown). The μCOIN device 160 may be used in conjunction with a pump 166 (e.g., a miniature diaphragm pump), a carrier gas source 168, a first valve 170, and a second valve 172. The μCOIN device 160 may be capable of collecting and injecting S/VOCs over a greater range of vapor pressures than other collection and injection devices.

The μPP 162 and the μPHI 164 may be similar to the μPP device 30 (FIGS. 2A-3B), and the μPHI device 80 (FIGS. 4-5A), respectively. In various aspects, the μCOIN device 160 may include a single top substrate and a single bottom substrate. The top substrate may include a first substrate portion similar to the first substrate 32 of the μPP device 30. The bottom substrate may include a second substrate portion similar to the second substrate 33 of the μPP device 30. The top substrate may further include a third substrate portion similar to the top substrate 82 of the μPHI device 80. The bottom substrate may further include a fourth substrate portion similar to the bottom substrate 84 of the μPHI device 80. Thus, the top substrate may include the first and third substrate portions and the bottom substrate may include the second and fourth substrate portions.

The μCOIN device 160 may include one or more conduits 173 to fluidly connect the μPP 162 and the and the μPHI 164 to one another, other devices (e.g., a downstream separation column), and components (e.g., pump 166, carrier gas source 168, and valves 170, 172). The top substrate and the bottom substrate may cooperate to form the conduits 173. For example, one or both of the top substrate and the bottom substrate may include channels that form all or a portion of the conduits 173. The bottom substrate may include heating units (not shown) disposed adjacent to the conduits 173 to increase a temperature of a fluid passing through the conduits 173. The conduits 173 may be thermally isolated.

The μPP 162 may include an array of microscale diffusion channels 174 defined by the first substrate portion. The μPP 162 may further include a first collection material 176 disposed in a first sub-compartment or region 177 and a second collection material 178 disposed in a second sub-compartment or region 179. The first collection material 176 may be configured to capture gas-phase compounds within a first range of vapor pressures. The second collection material 178 may be configured to capture gas-phase compounds within a second range of vapor pressures. The μPP 162 may further include one or more μPP heating units (not shown) disposed in thermal communication with the second substrate portion and configured to heat at least a portion of the first and second sub-compartments 177, 179. The first and second collection materials 176, 178 may be retained in the respective first and second sub-compartments 177, 179, at least in part, by a plurality of retention members, such as pillars 180. A portion of the pillars 180 may create a physical barrier between the first and second sub-compartments 177, 179.

The first collection material 176 in the first sub-compartment 177 may at least partially surround a central outlet 184. The second collection material 178 in the second sub-compartment 179 may at least partially surround the first sub-compartment 177. Thus, the first and second sub-compartments 177, 179 may be concentrically disposed about the central outlet 184. The microscale diffusion channels 174 may be disposed at least partially surrounding the second sub-compartment 179. Accordingly, the μPP 162 may be configured for radially-inward diffusion or flow.

In certain aspects, the first and second collection materials may be porous. The first and second collection materials 176, 178 may be free-flowing adsorbent (e.g., granules) or deposited adsorbent (e.g., thick film or thin film). In certain aspects, the first and second collection materials 176, 178 may be independently selected from the group consisting of a thick-film adsorbent and a granular adsorbent. The adsorbent granules may be present in more than a single layer. Accordingly, its use may facilitate a higher device capacity than those including a thin film adsorbent.

In some variations, the first collection material 176 may comprise a first plurality of adsorbent granules. The adsorbent granules of the first plurality may define a first average specific surface area. The second collection material 178 may comprise a second plurality of adsorbent granules. The adsorbent granules of the second plurality may define a second average specific surface area. The second average specific surface area may be less than the first average specific surface area. Lower volatility components may adsorb onto the upstream second collection material 178. Higher volatility components may adsorb onto the downstream first collection material 176. As discussed above, first and second collection materials 176, 178 may differ from one another in different or additional ways, such as by composition.

In various alternative aspects, the μPP 162 may include different quantities of sub-compartments and collection materials (not shown). For example, the μPP 162 may further include a third collection material in a third sub-compartment or region (e.g., annular region) concentrically disposed about the second sub-compartment 179. The first collection material may be configured to capture gas-phase compounds within a third range of vapor pressures. The third collection material may comprise a third plurality of adsorbent granules having a lower specific surface area than that of the second plurality of adsorbent granules. In other examples, the μPP 162 may include a single collection material (see, e.g., the μPP device 30 of FIGS. 2A-3B), four collection materials, five collection materials, six collection materials, seven collection materials, eight collection materials, nine collection materials, or ten collection materials, by way of non-limiting example. Each collection material may be configured to capture gas-phase compounds within a respective range of vapor pressures. The vapor pressure ranges may be distinct, overlapping, or substantially the same.

S/VOCs are discharged from the μPP 162 via thermal desorption. The thermally-desorbed S/VOCs are transferred from the μPP 162 to the μPHI 164 via operation of the pump 166. More particularly, the S/VOCs are pulled radially-inwardly toward the central outlet 184 of the μPP 162. The S/VOCs then flow through the conduit 173 to the μPHI 164. The S/VOCs flow through the μPHI 164 in a first direction 186.

The μPHI 164 may extend between a first end 200 having a primary port 201 and a second end 202 having a secondary port 203. The first direction 186 may generally be defined by a path from the first end 200 to the second end 202. The μPHI 164 may include the third and fourth substrate portions. The μPHI 164 may further include a third collection material 204 disposed in a third sub-compartment or region 205 and a fourth collection material 206 disposed in a fourth sub-compartment or region 207. In certain aspects, the third and fourth collection materials 204, 206 may be porous. The third and fourth collection materials 204, 206 may be free-flowing adsorbent (e.g., granules) or deposited adsorbent (e.g., thick film or thin film). In certain aspects, the third and fourth collection materials 204, 206 may be independently selected from the group consisting of a thick-film adsorbent and a granular adsorbent. The adsorbent granules may be present in more than a single layer. Accordingly, its use may facilitate a higher device capacity than those including a thin film adsorbent. In some variations, the third and fourth collection materials may be retained in the respective third and fourth sub-compartments 205, 207, at least in part, by a plurality of retention members, such as pillars 208. A portion of the pillars 208 may create a physical barrier between the third and fourth sub-compartments 205, 207.

In various aspects, the third collection material 204 may be the same as the first collection material 176, and the fourth collection material 206 may be the same as the second collection material 178. In various alternative aspects, the μPHI 164 may include different quantities of sub-compartments and collection materials, such as one collection material (see, e.g., the μPHI device 80 of FIGS. 4-5A), four collection materials, five collection materials, six collection materials, seven collection materials, eight collection materials, nine collection materials, or ten collection materials, by way of non-limiting example. Each collection material may be configured to capture gas-phase compounds within a respective range of vapor pressures. The ranges of vapor pressures may be distinct, overlapping, or substantially the same. The collection materials may be arranged from lowest specific surface area to highest specific surface area in a downstream direction during adsorption, as described above with respect to the μPP 162.

The μPHI 164 further includes a plurality of μPHI heating units (not shown). The μPHI heating units are configured to sequentially or concurrently heat the second cavity to desorb S/VOCs from the third and fourth collection materials 224, 226. The μPHI heating units may be configured to be actuated beginning at the second end 202, and ending at the first end 200 during sequential operation. During desorption, carrier gas from the carrier gas source 168 generally flows from the second end 202 of the μPHI 164 to the first end 200 in a second direction 210 opposite the first direction 186. The S/VOCs flow together with the carrier gas in the second direction 210 and are discharged to a downstream component (e.g., a separation column) at 212. Thus, flow during adsorption and desorption are in opposite directions.

During desorption of the μPHI 164, the μPP 162 may optionally be purged with carrier gas from the carrier gas source 168, for example by splitting the flow of carrier gas between the μPHI 164 and the conduit 173 (to the μPP 162). A flow path through the μPHI 164 may be pressurized to prevent backflow of the S/VOCs back to the μPP 162.

With reference to FIG. 6B, another μCOIN device 160' according to various aspects of the present disclosure is provided (shown schematically). The μCOIN device 160' includes integrated μPP 162' and μPHI 164' components. The μPP 162' and the μPHI 164' are fluidly connected in series, with the μPHI 164' being disposed downstream of the μPP 162'. The μPP 162' and the μPHI 164' may be integrated onto a single microchip, as shown. In various alternative embodiments, the μPP 162' and the μPHI 164' may be discrete devices that are fluidly connected to one another in series (not shown). The μCOIN device 160' may be used in conjunction with a pump 166' (e.g., a miniature diaphragm pump), a carrier gas source 168', a first valve 170', and a second valve 172'.

The μPP 162' and the μPHI 164' may be similar to the μPP device 30 (FIGS. 2A-3B), and the μPHI device 80 (FIGS. 4-5A), respectively. In various aspects, the μCOIN device 160' may include a single top substrate and a single bottom substrate. The top substrate may include a first substrate portion similar to the first substrate 32 of the μPP device 30. The bottom substrate may include a second substrate portion similar to the second substrate 33 of the μPP device 30. The top substrate may further include a third substrate portion similar to the top substrate 82 of the μPHI device 80. The bottom substrate may further include a fourth substrate portion similar to the bottom substrate 84 of the μPHI device 80. Thus, the top substrate may include the first and third substrate portions and the bottom substrate may include the second and fourth substrate portions.

The μCOIN device 160' may include one or more conduits 173' to fluidly connect the μPP 162' and the and the μPHI 164' to one another, other devices (e.g., a downstream separation column), and components (e.g., pump 166', carrier gas source 168', and valves 170', 172'). The top substrate and the bottom substrate may cooperate to form the conduits 173'. For example, one or both of the top substrate and the bottom substrate may include channels that form all or a portion of the conduits 173'. The bottom substrate may include heating units (not shown) disposed adjacent to the conduits 173' to increase a temperature of a fluid passing through the conduits 173'.

The μPP 162' may include an array of microscale diffusion channels 174' defined by the first substrate portion. The μPP 162' may further include a first collection material 176' disposed in a first sub-compartment or region 177' and a second collection material 178' disposed in a second sub-compartment or region 179'. The first collection material 176' may be configured to capture gas-phase compounds within a first range of vapor pressures. The second collection material 178' may be configured to capture gas-phase compounds within a second range of vapor pressures. The μPP 162' may further include one or more μPP heating units (not shown) disposed in thermal communication with the second substrate portion and configured to heat at least a portion of the first and second sub-compartments 177', 179'. The first and second collection materials 176', 178' may be retained in the respective first and second sub-compartments 177', 179', at least in part, by a plurality of retention members, such as pillars 180'. A portion of the pillars 180' may create a physical barrier between the first and second sub-compartments 177', 179'.

The first collection material 176' in the first sub-compartment 177' may at least partially surround a central outlet 184'. The second collection material 178' in the second sub-compartment 179' may at least partially surround the first sub-compartment 177'. Thus, the first and second sub-compartments 177', 179' may be concentrically disposed about the central outlet 184'. The microscale diffusion channels 174' may be disposed at least partially surrounding the second sub-compartment 179'. Accordingly, the μPP 162' may be configured for radially-inward diffusion or flow.

In certain aspects, the first and second materials 176', 178' may be porous. The first and second collection materials 176', 178' may be free-flowing adsorbent (e.g., granules) or deposited adsorbent (e.g., thick film or thin film). In certain aspects, the first and second collection materials 176', 178' may be independently selected from the group consisting of a thick-film adsorbent and a granular adsorbent. In some variations, the first collection material 176' may comprise a first plurality of adsorbent granules. The adsorbent granules of the first plurality may define a first average specific surface area. The second collection material 178' may comprise a second plurality of adsorbent granules. The adsorbent granules of the second plurality may define a second average specific surface area. The second average specific surface area may be less than the first average specific surface area. Lower volatility components may adsorb onto the upstream second collection material 178'. Higher volatility components may adsorb onto the downstream first collection material 176'. As discussed above, first and second collection materials 176', 178' may differ from one another in different or additional ways, such as by composition.

In various alternative aspects, the µPP 162' may include different quantities of sub-compartments and collection materials (not shown). For example, the µPP 162' may further include a third collection material in a third sub-compartment or region (e.g., annular region) concentrically disposed about the second sub-compartment 179'. The first collection material may be configured to capture gas-phase compounds within a third range of vapor pressures. The third collection material may comprise a third plurality of adsorbent granules having a lower specific surface area than that of the second plurality of adsorbent granules. In other examples, the µPP 162' may include a single collection material (see, e.g., the µPP device 30 of FIGS. 2A-3B), four collection materials, five collection materials, six collection materials, seven collection materials, eight collection materials, nine collection materials, or ten collection materials, by way of non-limiting example. Each collection material may be configured to capture gas-phase compounds within a respective range of vapor pressures. The vapor pressure ranges may be distinct, overlapping, or substantially the same.

S/VOCs are discharged from the µPP 162' via thermal desorption. The thermally-desorbed S/VOCs are transferred from the µPP 162' to the µPHI 164' via operation of the pump 166'. More particularly, the S/VOCs are pulled radially-inwardly toward the central outlet 184' of the µPP 162'. The S/VOCs then flow through the conduit 173' to the µPHI 164'. The S/VOCs flow through the µPHI 164' in a direction 186'.

The µPHI 164' may extend between a first end 200' having a primary port 201 and a second end 202' having a secondary port 203'. The direction 186' may generally be defined by a path from the first end 200' to the second end 202. The µPHI 164 may include the third and fourth substrate portions. The µPHI 164' may further include a third collection material 204' disposed in a third sub-compartment or region 205' and a fourth collection material 206' disposed in a fourth sub-compartment or region 207'. The third and fourth collection materials may be retained in the respective third and fourth sub-compartments 205', 207', at least in part, by a plurality of retention members, such as pillars 208'. A portion of the pillars 208' may create a physical barrier between the third and fourth sub-compartments 205', 207'.

In various aspects, the third collection material 204' may be the same as the first collection material 176', and the fourth collection material 206' may be the same as the second collection material 178'. In various alternative aspects, the µPHI 164' may include different quantities of sub-compartments and collection materials, such as one collection material (see, e.g., the µPHI device 80 of FIGS. 4-5A), four collection materials, five collection materials, six collection materials, seven collection materials, eight collection materials, nine collection materials, or ten collection materials, by way of non-limiting example. Each collection material may be configured to capture gas-phase compounds within a respective range of vapor pressures. The ranges of vapor pressures may be distinct, overlapping, or substantially the same. The collection materials may be arranged from lowest specific surface area to highest specific surface area in a downstream direction during adsorption, as described above with respect to the µPP 162'.

The µPHI 164 further includes a plurality of µPHI heating units (not shown). The µPHI heating units are configured to sequentially or concurrently heat the second cavity to desorb S/VOCs from the third and fourth collection materials 224', 226'. The µPHI heating units may be configured to be actuated beginning at the first end 200', and ending at the first end 202' during sequential operation. During desorption, carrier gas from the carrier gas source 168' generally flows from the first end 200' of the µPHI 164' to the second end 202' in the direction 186'. The S/VOCs flow together with the carrier gas in the direction 186' and are discharged to a downstream component (e.g., a separation column) at 212'. Thus, flow during both adsorption and desorption is generally in the direction 186'.

Method of Detecting a Component in the Gas Phase

In various aspects, the present disclosure provides a method of detecting a component in the gas phase. The method includes using a microscale collector-injector (µCOIN) device collect and inject one or more components in the gas phase. The method is described in the context of the µCOIN device 160 of FIG. 6A, which includes the µPP 162 and the µPHI 164. Those skilled in the art will appreciate that methods according to certain aspects of the present disclosure may be performed using other system configurations including a µPP and a µPHI in accordance (e.g., the µPP device 30 in combination with the µPHI device 80, or the µCOIN device 160'). With reference to FIG. 7, a flowchart depicting the method is provided.

At 220, the method includes collecting one or more S/VOCs from an air sample in the µPP 162. Collecting the S/VOCs may be performed during a sampling period having a predetermined duration. The predetermined sampling period may be greater than or equal to about 0.5 hours to less than or equal to about 24 hours, optionally about 8 hours (e.g., a workday). Each S/VOC in the air sample may be collected at a known rate by using passive diffusion, without the use of artificial circulation. The sample may diffuse through the microscale diffusion channels 174 and a head space, and into the first and second sub-compartments 177, 179. Collecting the S/VOCs in the air sample may further include adsorbing the S/VOCs on the first and/or second collection materials 176, 178.

At 222, the method may include thermally desorbing the S/VOCs from the first and/or second collection materials 176, 178. The components may be thermally desorbed by actuating the µPP heating units. The µPP heating units may be actuated upon completion of the predetermined sampling period. The µPP heating units may be configured to heat the first and second sub-compartments 177, 179, as well as the first and second collection materials 176, 178, to facilitate rapid desorption of the S/VOCs from the first and/or second collection materials 176, 178. In various aspects, the µPP heating units may be configured to heat the first and second sub-compartments 177, 179 to a first temperature of greater than or equal to about 200° C., optionally greater than or equal to about 250° C., and optionally greater than or equal to about 300° C. The µPP heating units may be configured to heat the first and second sub-compartments to the first temperature in less than or equal to about 10 seconds, optionally less than or equal to about 5 second, optionally less than or equal to about 2 seconds, or optionally less than or equal to about 1 second. The heating may require less than or equal to about 5 watts of power, optionally less than or equal to about 4 watts of power, optionally less than or equal to about 3 watts of power, optionally less than or equal to about 2 watts of power, or optionally less than or equal to about 1 watt of power.

At 224, the method may include transferring the sample from the µPP 162 to the µPHI 164. Steps 222 and 224 may be performed concurrently. Transferring the sample may include actuating the pump 166 and/or valve 172 to cause suction flow to draw the sample out of the µPP 162 and into the µPHI 164. The pump 166 may be fluidly connected to the first, second, third, and fourth sub-compartments 177, 179,

205, 207 via the conduit 173. The pump 166 may be operated at a volumetric flow rate of less than or equal to about 10 mL/min, optionally less than or equal to about 9 mL/min, optionally less than or equal to about 8 mL/min, optionally less than or equal to about 7 mL/min, optionally less than or equal to about 6 mL/min, optionally less than or equal to about 5 mL/min, optionally less than or equal to about 4 mL/min, optionally less than or equal to about 3 mL/min, optionally less than or equal to about 2 mL/min, and optionally less than or equal to about 1 mL/min.

The sample may flow into the μPHI 164 in the first direction 186. At 226, the sample may be adsorbed on the third and/or fourth collection materials 204, 206 in the μPHI 164. At 228, a carrier gas, such as helium or scrubbed air, flows from the carrier gas source 168, through the secondary port 203, into the second and first sub-compartments 207, 205, and toward the primary port 201 in the second direction 210. The carrier gas may be transported from the carrier gas source 168 to the μPHI 164 by the internal pressure of the carrier gas source 168. In various aspects, the carrier gas may flow through the second cavity at a volumetric flow rate of greater than or equal to about 1 mL/min to less than or equal to about 5 mL/min, and optionally greater than or equal to about 2.5 mL/min to less than or equal to about 3 mL/min. In various aspects, the flow rate may be greater than or equal to about 0.05 mL/min to less than or equal to about 1 mL/min. The carrier gas may have a residence time in the μPHI 164 of greater than or equal to about 10 ms to less than or equal to about 2 s, optionally greater than or equal to about 10 ms to less than or equal to about 1 s, optionally greater than or equal to about 10 ms to less than or equal to about 500 ms and optionally greater than or equal to about 10 ms to less than or equal to about 100 ms.

At 230, the S/VOCs may be concurrently or progressively desorbed from the third and/or fourth collection materials 204, 206. During progressive desorption, a first μPHI heating unit disposed closest to the second end 202 of the μPHI 164 is actuated to thermally desorb a portion of the S/VOCs. After a delay time, a second μPHI heating unit is actuated to thermally desorb another portion of the S/VOCs. Each of the μPHI heating units may be actuated in sequence, from the first μPHI heating unit disposed closest to the second end 202, to a last μPHI heating unit disposed closest to the first end 200. As each of the μPHI heating units is actuated, a concentration of S/VOCs in the carrier gas increases, so that a sharp injection band is provided at the primary port 201 for transfer to another device (e.g., a downstream separation column).

The μPHI heating units may be operated at a ramp rate of greater than or equal to about 500° C./s to less than or equal to about 6,000° C./s, optionally greater than or equal to about 500° C./s to less than or equal to about 2,000° C./s, and optionally about 1000° C./s; a hold time of greater than or equal to about 1 s to less than or equal to about 10 s, and optionally greater than or equal to about 1 s to less than or equal to about 6 s; and a delay time of greater than or equal to about 50 ms to less than or equal to about 1 s, optionally greater than or equal to about 100 ms to less than or equal to about 500 ms, and optionally about 250 ms. In various aspects, the μPHI heating units may be operated at a delay time of greater than or equal to about 50 ms to less than or equal to about 150 ms.

The μPHI heating units may be operated as described above (see discussion accompanying FIGS. 5A-5B). Thus, each of the μPHI heating units may be actuated to bring adjacent portions of the third and fourth sub-compartments 205, 207 to a second temperature of greater than or equal to about 200° C., optionally greater than or equal to about 250° C., and optionally greater than or equal to about 300° C. Thus, each of the μPHI heating units may be operated at substantially the same temperature. However, in various alternative aspects, the μPHI heating units may be independently operated at different temperatures. Furthermore, time delays between operation of adjacent μPHI heating units may vary within the μPHI 164. In certain aspects, the μPHI heating units may be smaller and require less power than the μPP heating units.

Example

Embodiments of the present technology are further illustrated through the following non-limiting example.

Design and Fabrication

With reference to FIGS. 8A-8D, a μPP device 250 according to various aspects of the present disclosure is provided. The μPP device 250 is formed from a first top substrate 252 comprising silicon-on-insulator (SOI), and a first bottom substrate 254 comprising glass. The first top substrate 252 has an array of 171 substantially parallel diffusion channels 256 (also referred to as a "sampling grid"). The diffusion channels 256 (also referred to as "apertures") have an average lateral length of about 50 μm, an average lateral width of about 50 μm, and an average height of about 180 μm. The diffusion channels 256 are configured to permit diffusion of gases or vapors therethrough at a known rate according to Fick's laws, as described above.

The first top substrate 252 and the first bottom substrate 254 cooperate to define a first sub-compartment 258 (also referred to as an "inner bed") and a second sub-compartment 260 (also referred to as an "outer bed"). The first and second sub-compartments 258, 260 are concentrically disposed about a central outlet 262 (also referred to as an "outlet flow port"). The first and second sub-compartments 258, 260 are separated by a first plurality of pillars 264. The first sub-compartment 258 is at least partially filled with about 800 μg of a first adsorbent. The second sub-compartment 260 is at least partially filled with about 800 μg of a second adsorbent. The first adsorbent includes Carbopack X (C-X), having a specific surface area of about 240 $m^2$/g. The second adsorbent includes Carbopack B (C-B), having a specific surface area of about 100 $m^2$/g. The first and second adsorbents are loaded into the first and second sub-compartments 258, 260 via first, second, and third loading ports 266, 268, 270.

The μPP device 250 further comprises a first μPP heating unit 272 disposed substantially under the first adsorbent, and a second μPP heating unit 274 disposed substantially under the second adsorbent. The first and second μPP heating units 272, 274 are disposed on a top surface 276 of the first bottom substrate 254. The first and second μPP heating units 272, 274 are Ti/Pt heating units. The first and second μPP heating units 272, 274 are configured to heat the first and second adsorbents to about 250° C. during thermal desorption. The μPP device 250 further includes a first μPP RTD temperature sensor 278 (also referred to as an "inner bed RTD") disposed in the first sub-compartment 258 and a second μPP RTD temperature sensor 280 (also referred to as an "outer bed RTD") disposed in the second sub-compartment 260. The first and second μPP RTD temperature sensors 278, 280 are disposed concentrically inside of the first and second μPP heating units 272, 274, respectively. The μPP device 250 includes a chip heating unit 282 and a chip RTD temperature sensor 284 to facilitate heating the entire μPP device 250, as well as fluid interconnects. The top surface 276 of the first bottom substrate 254 includes a first bonding area 286 for coupling to the first top substrate 252. The μPP device 250 is wire-bonded to a first printed circuit board (PCB) 288.

Referring to FIGS. 9A-9B, a µPHI device 300 according to various aspects of the present disclosure is provided. The µPHI device 300 is formed from a second top substrate (not shown) comprising silicon-on-insulator (SOI), and a second bottom substrate comprising glass. The µPHI device 300 has linear topology with a third sub-compartment 304 and a fourth sub-compartment 306 (also collectively referred to as "adjacent adsorbent beds"). The third and fourth sub-compartments 304, 306 are disposed adjacent to one another. The third sub-compartment 304 is at least partially filled with about 400 µg of the first adsorbent. The fourth sub-compartment 306 is at least partially filled with about 500 µg of the second adsorbent. The third and fourth sub-compartments 304, 306 are separated by a second plurality of pillars 308.

The µPHI device 300 includes a primary port 310 (also referred to as an "inlet port") and a secondary port 312 (also referred to as an "outlet port" or "exhaust port"). The primary and secondary ports 310, 312 are in fluid communication with the third and fourth sub-compartments 304, 306. The µPHI device 300 further includes ten individually-addressed µPHI heating units 314, and ten respective µPHI RTD temperature sensors 316. The µPHI heating units 314 are Ti/Pt heating units that are configured to progressively heat the sub-compartments 304, 306. The second bottom substrate 302 includes a second bonding area 318 for coupling the second bottom substrate 302 to the second top substrate (not shown). The µPHI device 300 is wire-bonded to a second PCB 320.

The µPP device 250 and the µPHI device 300 are created using the same micro-fabrication process flow. The diffusion channels 256, sub-compartments 258, 260, 304, 306 and loading ports 266, 268, 270, and primary and secondary ports 310, 312 are fabricated using deep reactive ion etching (DRIE). The heating units 272, 274, 282, 314 and RTD temperature sensors 278, 280, 284, 316 are deposited on respective first and second bottom substrates 254, 302 using physical vapor deposition (PVD). Oxynitride over-layers are deposited on respective first and second bottom substrates 254, 302 using plasma-enhanced chemical vapor deposition (PECVD). The first top and bottom substrates 252, 254 are joined in the first bonding area 286 by Au—Si eutectic bonding. The second top substrate (not shown) and the second bottom substrate 302 are joined in the second bonding area 318 by Au—Si eutectic bonding. Adsorbents are loaded into respective sub-compartments 258, 260, 304, 306. Interconnecting capillaries are epoxy sealed. The µPP and µPHI devices 250, 300 are mounted and wire-bonded onto the respective first and second PCBs 288, 320.

Discrete Device Tests

Test chemicals are obtained at high purity from standard sources and are used without purification. Test atmospheres containing vapors of the test chemicals are generated from fritted-glass bubblers diluted with clean, dry air, and are verified by loop injection into a pre-calibrated gas chromatograph with flame ionization detector (GC-FID). Certain tests are performed using a thermogravimetric analyzer (TGA, Perkin Elmer). For other tests, The PCB-mounted µPP device 250 is mounted in a custom stainless steel chamber with electrical feedthroughs in the chamber floor. The capillary used for sample transfer is wrapped with heater coils and raised to about 70° C. during transfer. Following exposure for a given time period, the chamber is purged with clean, dry air. Then, the first and second µPP heating units 272, 274 are activated to heat the respective first and second sub-compartments 258, 260 to about 250° C., while drawing air through the first and second sub-compartments 258, 260 with a small pump at about 5 or 10 mL/min. The sample is passed through a surrogate focuser where the vapors are temporarily trapped and then injected into the GC-FID that is equipped with either a short capillary separation column or a section of (uncoated) deactivated silica guard column.

For the µPHI device 300, samples of the test chemicals are passed to the µPHI device 300 as low-volume vapor boluses, either from a sample loop connected to a 6-port valve or from a bench-scale GC. For the latter, the test chemical is either pure or dissolved in a volatile solvent and injected through the heated GC injection port using an autosampler syringe. The mass of test chemical is verified by pre-calibrated FID.

The µPHI heating units 314 are controlled and the µPHI RTDs are monitored by custom programs written in LabVIEW and run from laptop computers. The µPP device 250 has feedback controlled heating (via pulse width modulation). The µPHI device 300 has open loop heater control with independent voltages applied during ramp up and hold periods. However, in various alternative aspects the µPHI device 300 may have closed loop heater control Results and Discussion In general, the µPP device 250 can passively sample vapors at rates close to modeled values, retain captured vapors at high mass loading levels, and efficiently thermally desorb vapors for transfer to the µPHI device 300. The µPHI device can retain vapors, and provide sharp injection bands at low flow rates that are compatible with µGC separation columns.

(a) µPP Device Vapor Retention

In initial tests, separate 3-mg samples of C-X and C-B adsorbents are loaded into a sample pan, suspended from the TGA balance, and exposed to m-xylene vapor (one of the highest-vapor pressure targets to be studied). After allowing uptake of relatively large masses of 5-8 µg of m-xylene per mg of adsorbent, no loss (bleed) of the captured vapor is shown after two hours of purging with clean air at ambient temperature. This confirms that test vapors may be retained by the µPP device 250, even during periods of non-exposure.

(b) µPP Device Capacity (FIG. 10)

The µPP device 250 is suspended in the TGA and exposed to 2000 mg/m$^3$ of m-xylene vapor and mass uptake via passive sampling is measured in real time. FIG. 10 is a graphical representation of mass uptake in the µPP device 250 as a function of time. An x-axis 330 represents time in minutes and a y-axis 332 represents mass uptake in µm. A sampling rate is constant for approximately 40 minutes, as shown in a first region 334. The sampling rate drops by 30% from 40-60 minutes, as shown in a second region 336. The sampling rate drops to zero (saturation) at about 80 minutes, as indicated by saturation point 338. The total mass uptake is about 32 µg and the sampling rate is constant up to about 23 µg. Other tests demonstrate that capacity is inversely proportional to vapor pressure for homologous aromatic hydrocarbons. Therefore, µPP device capacity is expected to accommodate numerous S/VOCs of interest.

(c) µPP Device Sampling Rate

Chamber tests with the µPP device 250 show that the sampling rate for m-xylene is constant over three orders of magnitude in concentration (i.e., from about 8 mg/m$^3$ to about 5,600 mg/m$^3$; 15-minute samples). Furthermore, tests with both m-xylene and DMMP show that the sample rates are within 15% of those predicted by theory and modeling, as shown in Table 1 below.

TABLE 1

μPP Device sampling rate for m-xylene and DMMP.

| S/VOC | Modeled S (mL/min) | Experimental S (mL/min) | Ratio |
|---|---|---|---|
| m-xylene | 0.60 | 0.69 | 1.15 |
| DMMP | 0.44 | 0.48 | 1.09 |

(d) μPP Device Desorption Efficiency (FIG. 11)

A simple mixture of four vapors in a chamber is sampled with the μPP device 250. The sample transferred to the surrogate focuser. The sample is injected into a bench-scale GC-FID. With reference to FIG. 11, a chromatogram 350 from the GC-FID is provided. An x-axis 350 represents time in minutes. A y-axis 354 represents FID signal in pA. Desorption efficiencies are in a range of about 88-98%.

(e) μPHI Device Capacity (FIG. 12)

To test the capacity of the μPHI device 300, breakthrough is monitored by the GC-FID using boluses of known test atmospheres passed directly through the μPHI device 300 in a certain volume of carrier gas to mimic desorption from a μPP device. The μPHI device 300 is subsequently heated to 250° C. using global or progressive heating to desorb the retained vapors. The percentage of mass retained is evaluated by the ratio of challenged vapor mass to the desorbed vapor mass.

Initial tests are performed with boluses containing 1.6 μg and 3.6 μg of m-xylene. These masses may correspond to possible μCOIN device exposure scenarios. For example, at a sampling rate of S=0.6 mL/min, a μPP device would collect about 1.6 μg within 30 minutes when exposed to 90 mg/m$^3$, and about 3.6 μg in 30 minutes when exposed to 200 mg/m$^3$. It is anticipated that the volume of air required to transfer samples from the μPP device to the μPHI device will be less than about 5 mL.

Referring to FIG. 12, a fractional retention plot 370 according to various aspects of the present disclosure is provided. An x-axis 372 represents transfer volume in mL. A y-axis 374 represents percentage mass retained. A first curve 376 corresponds to 1.6 μg m-xylene. A second curve 378 corresponds to 3.6 μg m-xylene. As indicated at a first data point 380, for a 1.6 μg sample, the μPHI device 300 has a capture efficiency of greater than about 95% for transfer volumes as large as about 50 mL. As indicated at a second data point 382, the μPHI device 300 can retain greater than about 95% of a 3.6 μg sample of m-xylene if the transfer volume is less than 12 mL. Therefore, the μPHI device 300 has a high capture efficiency for m-xylene, particularly for the 1.6 μg bolus.

(f) μPHI Device Desorption (FIGS. 13-14)

The μPHI heating units of the μPHI device 300 may be operated globally (i.e., concurrently) or sequentially. The control software allows adjustment of the individual ramp rate, heater ON time (hold-time), and delay between adjacent heating units. With reference to FIG. 13A, a temperature profile for ten μPHI RTD temperature sensors according to various aspects of the present disclosure is provided. An x-axis 402 represents time in seconds. A y-axis 404 represents temperature in ° C. A first curve 406 represents a first RTD corresponding to a first μPHI heating unit. A second curve 408 represents a second μPHI RTD corresponding to a second μPHI heating unit. A third curve 410 represents a third μPHI RTD corresponding to a third μPHI heating unit. A fourth curve 412 represents a fourth μPHI RTD corresponding to a fourth μPHI heating unit. A fifth curve 414 represents a fifth μPHI RTD corresponding to a fifth μPHI heating unit. A sixth curve 416 represents a sixth μPHI RTD corresponding to a sixth μPHI heating unit. A seventh curve 418 represents a seventh μPHI RTD corresponding to a seventh μPHI heating unit. An eighth curve 420 represents an eighth μPHI RTD corresponding to an eighth μPHI heating unit. A ninth curve 422 represents a ninth μPHI RTD corresponding to a ninth μPHI heating unit. A tenth curve 424 represents a tenth μPHI RTD corresponding to a tenth μPHI heating unit. The μPHI heating units are configured to have a ramp rate of about 4000° C./s, a hold time of about 1 s, a delay time of about 60 ms, and an applied voltage of about 25 V.

Experiments are performed to assess the combination of heating and flow parameters that would provide the sharpest injection band. The best results are obtained when the residence time of vapor above each heating unit is held close to the firing delay between individual heating units (approximately 100 ms). For this purpose, the flow rate is reduced to approximately 50 μL/min (with a residence time of approximately 300 ms) during the desorption process until all heating units reach 250° C. and the sample is completely injected, at which point flow is increased to about 3 mL/min to complete the transfer to the FID (no column is used).

FIG. 14 is a graphical representation of an injection band according to various aspects of the present disclosure. An x-axis 440 represents time in seconds. A y-axis represents FID response in pA. A full width at half maximum (FWHM) 444 for the m-xylene peak is approximately 190 ms. An area 446 is about 200 pA-s. A desorption efficiency is about 98%.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A microscale progressively-heated injector (pPHI) device comprising: a first substrate comprising a first plurality of layers comprising a first insulator layer; a second substrate coupled to the first substrate, the first substrate and the second substrate cooperating to define a compartment, the second substrate comprising a second plurality of layers comprising a second insulator layer; a first collection material disposed within the compartment on a surface of the second plurality of layers, and configured to capture compounds within a first range of vapor pressures, the first collection material comprising a first plurality of adsorbent granules; and a plurality of heating units disposed in thermal communication with the compartment and configured to individually and sequentially heat respective portions of the compartment.

2. The μPHI device of claim 1, wherein each of the first insulator layer and the second insulator layer comprise silicon oxynitride.

3. The μPHI device of claim 1, wherein the first plurality of layers comprises
an outer layer comprising silicon,
an inner layer comprising silicon, and
the first insulator layer between the outer layer and the inner layer.

4. The μPHI device of claim 1, wherein the second plurality of layers comprises
an outer layer comprising glass, and
the second insulator layer.

5. The μPHI device of claim 4, wherein each of the plurality of heating units is in the second insulator layer.

6. The μPHI device of claim 1, further comprising a second collection material disposed within the compartment, the second collection material being configured to capture compounds within a second range of vapor pressures.

7. The μPHI device of claim 6, further comprising a third collection material disposed within the compartment, the third collection material being configured to capture compounds within a third range of vapor pressures.

8. The pPHI device of claim 7, wherein the second collection material comprises a second plurality of adsorbent granules, and the third collection material comprises a third plurality of adsorbent granules.

9. The μPHI device of claim 6, wherein the first collection material is entirely in a first region and the second collection material is entirely in a second region different than the first region.

10. The μPHI device of claim 6, wherein
the second collection material is configured to be upstream of the first collection material during adsorption, and
the first collection material is configured to be upstream of the second collection material during desorption.

11. The μPHI device of claim 1, wherein the first plurality of adsorbent granules define a first average specific surface area, and the second collection material comprises a second plurality of adsorbent granules defining a second average specific surface area, and the second average specific surface area being different from the first average specific surface area.

12. The μPHI device of claim 1, wherein the μPHI device is configured to discharge a sample in an injection band having a full width at half maximum width (FWHM) of less than or equal to about 250 ms.

13. The μPHI device of claim 12, wherein the FWHM is less than or equal to about 200 ms.

14. The μPHI device of claim 1, wherein the plurality of heating units comprises greater than or equal to 5 to less than or equal to 20 heating units.

15. The μPHI device of claim 14, wherein the plurality of discrete heating units comprises greater than or equal to 10 discrete heating units to less than or equal to 15 heating units.

16. The μPHI device of claim 1, wherein the heating units of the plurality of discrete heating units are thermally isolated from one another.

17. The μPHI device of claim 1, wherein each heating unit of the plurality of discrete heating units is configured to heat a respective portion of the compartment.

18. The μPHI device of claim 1, further comprising a plurality of retention members extending between the first substrate and the second substrate, the plurality of retention members cooperating with the first substrate and the second substrate to retain the first collection material within the compartment.

19. The μPHI device of claim 1, wherein the first substrate and the second substrate are coupled to one another by eutectic bonding, anodic bonding, epoxy, or a combination thereof.

20. The μPHI device of claim 1, wherein a head space is defined between the first collection material and the first plurality of layers.

21. The μPHI device of claim 1, wherein the heating units of the plurality of discrete heating units disposed in an order along a line, and configured to sequentially heat respective portions of the compartment in the line.

* * * * *